United States Patent
Dabrowski et al.

(10) Patent No.: US 6,919,950 B2
(45) Date of Patent: Jul. 19, 2005

(54) LIQUID CRYSTAL DEVICE AND A LIQUID CRYSTAL MATERIAL

(76) Inventors: Roman S. Dabrowski, ul. Buska 40, PL-02-924 Warszawa (PL); Witold J. Drzewinski, Blizne Laszczynskiego, ul. Graniczna 31, PL-05-082 Babice (PL); Herman Pauwels, Kerkstraat 37, BE-9870 Zulte (BE); Anders Dahlgren, Krokslätts Parkgata 63A, SE-431 Mölndal (SE); Sven T. Lagerwall, Snackvägen 30, SE-414 75 Göteborg (SE); Per Rudquist, Timgatan 10, SE-415 08 Göteborg (SE); Koen D'Have, Omgången 448-22, SE-412 80 Göteborg (SE); Marek Matuszcyk, Sippedalsvägen 8, SE-433 31 Partille (SE); Pontus Jagemalm, Scheelegatan 4B, SE-416 60 Göteborg (SE)

( * ) Notice: Subject to any disclaimer, the term of this patent is extended or adjusted under 35 U.S.C. 154(b) by 279 days.

(21) Appl. No.: 09/939,695

(22) Filed: Aug. 28, 2001

(65) Prior Publication Data

US 2002/0075445 A1 Jun. 20, 2002

Related U.S. Application Data

(60) Provisional application No. 60/228,448, filed on Aug. 29, 2000.

(51) Int. Cl.[7] ........................ G02F 1/137; G02F 1/141
(52) U.S. Cl. ..................... 349/174; 349/86; 349/89; 349/100; 349/193
(58) Field of Search ........................ 349/18, 37, 86, 349/89, 100, 113, 117, 133, 143, 158, 172, 173, 174, 193, 98, 115, 119, 171

(56) References Cited

U.S. PATENT DOCUMENTS

| | | |
|---|---|---|
| 5,340,498 A | 8/1994 | Arai et al. |
| 5,723,069 A | 3/1998 | Mineta et al. |
| 5,728,864 A | 3/1998 | Motoyama et al. |
| 5,968,413 A | 10/1999 | Mine et al. |
| 6,002,042 A | 12/1999 | Mine et al. |
| 6,040,889 A * | 3/2000 | Takatori et al. ............. 349/174 |

FOREIGN PATENT DOCUMENTS

GB    2 317 186 A    3/1998

OTHER PUBLICATIONS

Taylor et al., "Biaxial Liquid Crystals," *Physical Review Letters*, vol. 24, No. 8 (1970) pp. 359–364.
Cvikl et al., "On Form Birefringence of Some Smectic Liquid Crystals," *Molecular Crystals and Liquid Crystals*, vol. 12, (1971), pp. 267–276.
Lavelut et al., "Two New Mesophases in a Chiral Compound," *J. Physique*, vol. 44 (1983) pp. 623–629.
Galerne et al., "Smectic–O Films," *Physical Review Letters*, vol. 64, No. 8 (1990) pp. 906–910.
Galerne et al., "Antiferroelectric Chiral Smectic–O Liquid Crystal," *Physical Review Letters*, vol. 66, No. 22 (1991) pp. 2891–2894.
Cladis et al., Electrooptic Response of Smectic O and Smectic O*,* *Liquid Crystals*, vol. 14, No. 5 (1993) pp. 1327–1349.

(Continued)

*Primary Examiner*—Robert H. Kim
*Assistant Examiner*—Tai Duong
(74) *Attorney, Agent, or Firm*—Burns, Doane, Swecker & Mathis, LLP

(57) ABSTRACT

The invention relates to a liquid crystal device, comprising an antiferroelectric liquid crystal material (AFLC material) having smectic layers, and two substrates confining the AFLC material therebetween, wherein the AFLC material is uniaxial negative. Preferably, the AFLC material is uniaxial as a consequence of a surface stabilization and of a selected smectic tilt angle θ of the AFLC material. Preferably, the angle θ is in the range of $40° \leq \theta \leq 50°$, especially 45°. The invention also relates to electrooptic liquid crystal devices.

65 Claims, 13 Drawing Sheets

OTHER PUBLICATIONS

Takanishi et al., "Tristable Switching in SmO* of 1–Methylheptyl–Terephthalidene–Bis–Aminocinnamate (MHTAC) and Its Miscibiity with $SmC_A^*$ of Antiferroelectric Chiral Smectic Liquid Crystal," *Jpn. J. Appl. Phys.* vol. 32 (1993) pp. 4605–4610—Part 1, No. 10, Oct. 1993.

De Meyere et al., :Grating Diffraction in (Anti–) Ferroelectric Liquid Crystal Displays, *Ferroelectrics*, vol. 181 (1996) PP. 1–10.

De Meyere et al., "Geometrical Averaging of AFLC Dielectric Tensors," *Mol. Cryst. Liq. Cryst*, vol. 317 (1996) pp. 99–110.

Robinson et al., "Preliminary Communication Bi–Mesogenic Organosiloxane Liquid Crystal Materials Exhibiting Antiferroelectric Phases," *Liquid Crystals*, vol. 23, No. 2, (1997) pp. 309–312.

Robinson et al., "Ferroelectric and Antiferroelectric Low Molar Mass Organosiloxane Liquid Crystals," *Liquid Crystals* vol.. 25, No. 3, (1998) pp. 301–307.

Wang et al., "Fréedaricksz Transition in Antiferroelectric Liquid Crystals and Cooperative Motion of Smectic Layers," *Physical Review E*, vol. 58, No. 5 (1998) pp. 5919–5922.

Qian et al., "Field–Induced Phase Transistions in Antiferroelectric Liquid Crystals," *Physical Review E*, vol. 60, No. 3, (1999) pp. 2978–2984.

Zhang et al., "Fréedericksz Transition in an Anticlinic Liquid Crystal," *Physical Review E*, vol. 84, No. 18, (2000) pp. 4140–4143.

Zhang et al., "Fréedericksz Transition in an Anticlinic Liquid Crystal," *Physical Review E*, vol. 62, No. 6 (2000) pp. 8152–8158.

Fukuda et al., "Antiferroelectric Chiral Smectic Liquid Crystals," *J. Mater Chem.*, vol. 4, No. 7 (1994) pp. 997–1016.

A. Fukuda, S6–1 Invited Pretransitional Effect in AF–F Switching: to Suppress it or to Enhance It, That is My Question About AFLCDs, *Asia Display 95*, pp. 61–64 (1995).

Yamada et al., "Ferroelectric Liquid Crystal Display Using Tristable Switching," *Japanese Journal of Applied Physics*, vol. 29, No. 9, (1990) pp. 1757–1764.

Yamamoto et al., "Multiplexing Performance of Antiferroelectric Liquid Crystal Device," *Jpn. J. Appl. Phys*, vol. 31, pp. 3186–3188—Part 1, No. 9B, Sep. 1992.

Yamada et al., "Multcolor Video–Rate Antiferroelectric LCD with High Contrast and Wide Viewing Angle,", *Journal of the SID*, vol. 1 No. 3 (1993) PP. 289–293.

Yamamoto et al., "Full–Color Antiferroelectric Liquid Crystal Display," *Ferroelectrics*, vol. 149 (1993) pp. 295–304.

Koshoubu et al., "S6–3 Driving Technique in Full–Color Antiferroelectric Liquid Crystal Displays," *Asia Display '95* pp. 69–72 (1995).

Nakamura et al., "Full–Color Antiferroelectric Liquid Crystal Displays with High Contrast Ratio," *Ferroelectrics*, vol. 179 (1996) pp. 131–140.

Ulrich et al., "Optical Properties of Ferroelectric and Anti–Ferroelectric Liquid Crystals," Chapter 9 in *The Optics of Thermotropic Liquid Crystals*—Elston and Sambles Editors—pp. 195 Taylor & Francis Articles (1998).

Beccherelli et al., "Evaluation of Optical Anisotropy in the Pretransitional Regime in Antiferroelectric Liquid Crystals," *Liquid Crystals*, vol. 25, No. 5, (1998) pp. 573–577.

D'havé et al., "Solution of the Dark State Problem in Antiferrolectric Liquid Crystal Displays," *Applied Physics Letters*, vol. 76, No. 24, (2000) pp. 3528–3530.

Lagerwall et al., "Unique Electro–Optical Properties of Liquid Crystals Designed for Molecular Optics," *Advanced Functional Materials*, vol. 11, No. 2 (2001) pp. 87–94.

D'Havé et al., "Antiferroelectric Liquid Crystals with 45α Tilt—A New Class of Promising Electro–Optic Materials," *Ferroelectrics*, vol. 244, (2000) pp. 115–128.

* cited by examiner $E < -E_{th}$ $E = 0$ $E > +E_{th}$

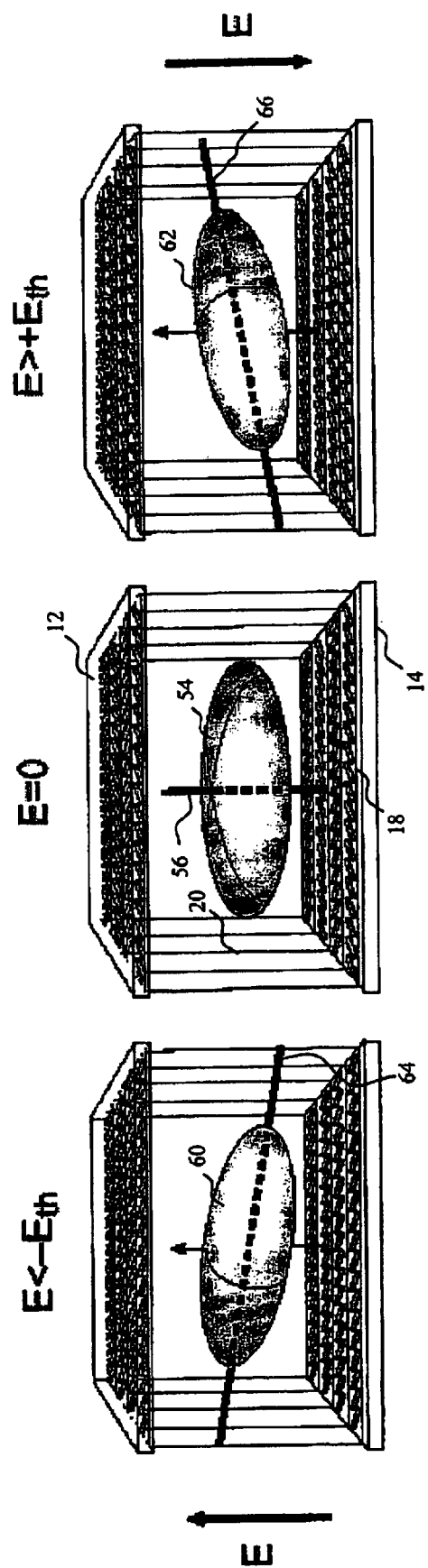

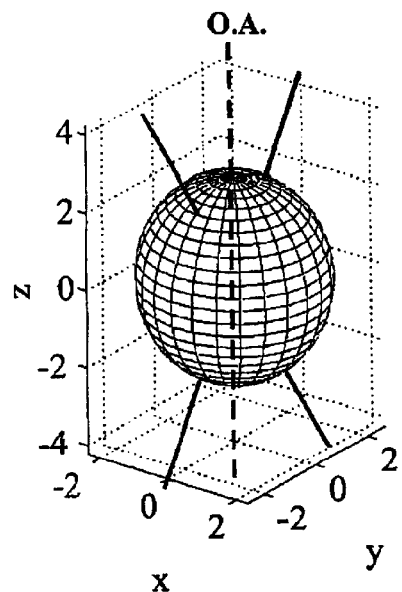
Fig. 13a    θ = 30°
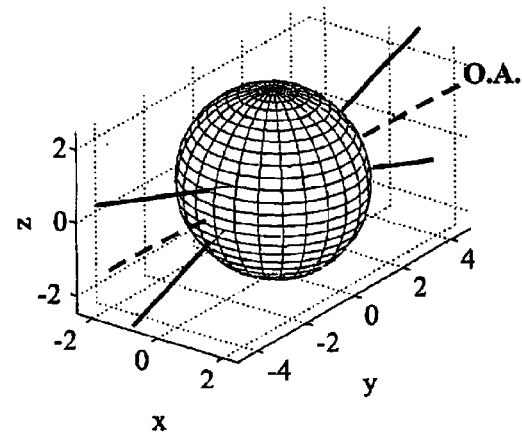
Fig. 13b    θ = 44°
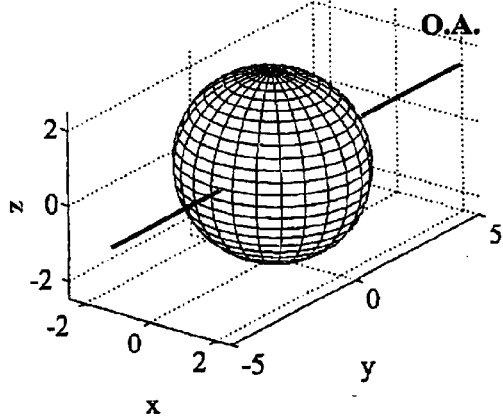
Fig. 13a    θ = 45°
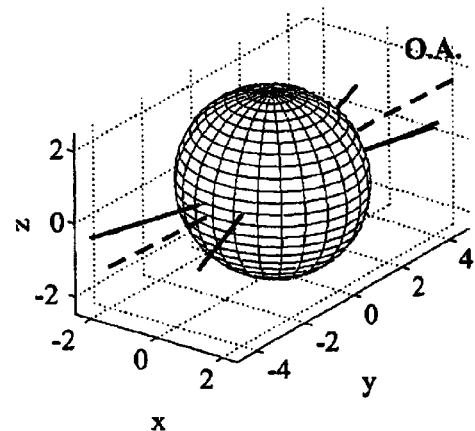
Fig. 13a    θ = 46°

LIQUID CRYSTAL DEVICE AND A LIQUID CRYSTAL MATERIAL

CROSS REFERENCE TO RELATED APPLICATION

Priority is claimed under 35 U.S.C §119(e) to U.S. Provisional Application No. 60/228,448, filed Aug. 29, 2000, that is herein incorporated by reference.

BACKGROUND OF THE INVENTION

The present invention generally relates to the field of smectic liquid crystals. More specifically, the invention relates in one aspect to an antiferroelectric liquid crystal device (AFLC device). A second aspect of the invention relates to a liquid crystal material as such, usable in such devices, especially an antiferroelectric crystal material of a new class. A third aspect of the invention relates to a liquid crystal device including a smectic anticlinic, non-chiral liquid crystal material.

The inventive AFLC device may especially be implemented as an electro-optic device, e.g. a display or a light modulator, but it can also be implemented as a passive component, e.g. a compensation film, where the unique properties of the inventive liquid crystal material also may be used.

The invention is related to the type of liquid crystals that is classified as smectic, i.e. with the molecules forming adjacent layers. In particular, the invention relates to anticlinic liquid crystals, meaning that molecules in adjacent smectic layers are tilted in opposite directions relative to the layer normal z. In the case where the material is also chiral, this so-called anticlinic order gives the liquid crystal antiferroelectric properties. In this case we speak of an antiferroelectric liquid crystal, abbreviated AFLC in the following. An AFLC has a local polarization along each smectic layer. The direction of this polarization is determined by the tilt direction to be either in the +y or −y direction. The anticlinic order therefore also corresponds to antipolar order which is the characteristic ground state for an antiferroelectric material.

The applications of the invention may find the most important examples in AFLC displays (AFLCDs). The AFLC device principle looks very attractive for high-resolution displays, and very important industrial investments have been made in order to realize such displays.

Considering that the present invention is thus presumably of high interest for use in AFLC Displays (AFLCDs)—although this is by no means the only field of use of the invention—a short description of a conventional AFLCD structure and the operation thereof will now be given with reference to FIGS. 1 to 4. In connection therewith, the problems encountered with such prior-art AFLCD structures will also be discussed in order to give a better understanding of the technical background of the invention.

FIGS. 1 and 2 schematically illustrate a small section of a conventional AFLCD structure, in which an antiferroelectric liquid crystal material (AFLC) 10 is confined between two solid supports 12 and 14, usually glass plates, although other materials may also be used. The two substrates 12 and 14 are separated in a controlled way by spacers (one spacer is very schematically illustrated at reference numeral 16) leaving space for the AFLC material 10. As schematically illustrated in FIGS. 1 to 3, the molecules 18 of the AFLC material 10 are arranged in parallel smectic layers 20.

The surfaces of the substrates 12, 14 facing the AFLC material 10 are coated with suitable electrode layers 22, 24 for defining pixels and suitable molecule aligning layers 26, 28. Further, the cell (substrates 12, 14+AFLC material 10) is orientated in such a way between two crossed polarizers 30, 32 that the smectic layers 20 and the layer normal z are essentially parallel and perpendicular, respectively, to the transmitting directions 30' and 32' of the polarizers 30 and 32. In use, electric fields E will be applied to the AFLC material 10 by means of the electrode layers 26, 28. In color displays, a color filter 29 would also be included.

As schematically illustrated in FIG. 3b, in a bulk sample of an AFLC material and without any external field applied (E=0) the molecules 18 would be tilted in essentially opposite directions (anticlinic order) with respect to the layer normal z in adjacent smectic layers 20. In a conventional AFLC bulk sample, the molecules 18 would not only be in an anticlinic order, but also form a helical superstructure, i.e. a helix in the direction of the layer normal z, mainly due to the molecular chirality. The period or the pitch of this helix usually extends over hundreds or thousands of smectic layers, e.g. in the order of 1 micron. However, in thin cells having a cell thickness comparable to the pitch of the helix, the helical superstructure maybe suppressed by surface action. This situation is referred to as a surface-stabilized antiferroelectric liquid crystal (SSAFLC). In the illustrated example of the prior-art AFLCD structure in FIGS. 1 and 2, the AFLC material 10 is assumed to be in such a surface-stabilized (SSAFLC) state. In the following, the term SSAFLC is defined as an AFLC material presenting no overall helix structure. It should be noted that the surface-stabilization requires either that the material is pitch-compensated (infinite pitch) or at least that the helical pitch is long compared with the thickness of the cell.

The smectic layers 20 of the SSAFLC material 1 would ideally be oriented perpendicular to the confining substrates 12, 14 (bookshelf structure) and with the smectic layer normal z oriented in a unique direction parallel to the substrates However, the inventors have demonstrated that, in practice, the prior-art AFLCD structures deviate slightly from this, having chevron-shaped folds in the layers. The reason for this phenomenon will be discussed below. Thus, it should be noted that FIGS. 1 and 2 are schematic especially in the sense that the prior-art structures will not present an ideal bookshelf structure.

In the zero-field condition E=0 (FIG. 3b), the anticlinic structure of the prior-art SSAFLC material is generally biaxial with the three principal indices of refraction, $n_\alpha$, $n_\beta$, and $n_\gamma$ (with the definition $n_\alpha < n_\beta < n_\gamma$) and with the two crystallographic optic axes lying in a common plane (the yz-plane) essentially perpendicular to the cell plane. Thus, for normal incident light in the zero-field condition (E=0), the AFLC material acts effectively as a uniaxial retarder with its effective optic axis directed parallel to the substrates 12, 14, i.e. in the cell plane, along the smectic layer normal z. The $\gamma$ direction represents the effective optic axis and is along the smectic layer normal. Hence, for crossed polarizers along and perpendicular to the smectic layer normal z we would, in principle, get a dark state. However, if a sufficiently strong electric field E is applied over the cell, the liquid crystal material would be switched to a bright state.

At $E > E_{th}$ and at $E < -E_{th}$ (applied perpendicular to the cell plane), the AFLC material is switched from the anticlinic antiferroelectric state (AF) into one of two synclinic, ferroelectric states (±F), referred to as an AFF transition. More specifically, depending on the sign of E, the effective optic axis will be tilted away an angle $+\theta_F$ or $-\theta_F$ from the polarizer axis in the ferroelectric states, as indicated in FIG. 3a (E>+Eth) and FIG. 3c (E<Eth). This gives bright states, and as the optic axis of the two ferroelectric states is symmetric around the z direction, the two states give the same transmission.

FIG. 4 schematically illustrates a hysteresis loop for the above-described operation of the prior-art AFLCD structure. The transmission T of the cell is plotted against the applied electric voltage V over the cell. The above-mentioned threshold field values $+E_{th}$ and $-E_{th}$ correspond to threshold voltage values $+V_{th}$ and $-V_{th}$, respectively, in FIG. 4.

Even in passive multiplex drive, the gray scale of an AFLC device can be directly controlled by the amplitude of the applied voltage V, as exemplified at transmissions $T_2$, $T_3$ and $T_4$ in FIG. 4. The electrooptic characteristics of AFLCs allows for a very simple addressing of AFLC displays. In a matrix display, the individual picture elements (pixels) are formed by the overlaps between the "row electrodes" on one substrate and the "column electrodes" on the opposite substrate. The individual rows are addressed one at a time (multiplex drive).

However, in all multiplexing there is crosstalk, i.e. also pixels not belonging to the addressed row (selected row) will be subjected to non-zero voltages while driving the display. In the simplest case, the gray level of a given pixel is set by applying a writing pulse followed by a holding voltage $V_H$. The holding voltage $V_H$ prevents the pixel from returning to the dark state after the writing pulse is no longer applied. Therefore, two conditions must be met: (i) $V_H$ must be lower than the threshold voltage $V_{th}$ for AFF switching and (ii) $V_H$ must be higher than the maximum voltage for which the AFLC material would return from the ferroelectric to the antiferroelectric state FAF transition). In other words, $V_H$ lies between the up slope and the down slope of the double hysteresis loops in FIG. 4.

As a result of the above-described crosstalk, in passive-matrix AFLCDs each individual pixel is always subjected to a voltage which is at least as high as the holding voltage $V_H$. Thus, pixels which are supposed to be completely black, will not at all experience V=0 but instead $V \approx V_H$. Due to the pretransitional effect, these pixels will not give a transmission T=0 (total extinction) but rather $T=T_1$ as indicated in FIG. 4. The crosstalk in combination with the pretransitional effect below the AFF transition therefore leads to a severe light leakage in the "dark state" of prior-art AFLCDs.

During the last decade, considerable attention has been given to the potential use of AFLCs in high-resolution flat-panel displays and microdisplays for computers and TV. Despite the obviously very attractive and well-known electro-optic characteristics of AFLCs, such as the tri-state switching behavior, easy DC-compensation, fast response (microseconds), easy gray scale, and wide viewing angle, there are still no commercial AFLC devices available on the market.

The main reason why AFLC devices have still not become commercially viable is the relatively low contrast achieved so far. The contrast is essentially ruled by the extinction in the dark state. In the following, this problem in the prior art will be referred to as "the dark-state problem".

In general terms, the dark state can be said to be determined by the electrooptic behavior in a voltage range centered on V=0 and limited on both sides by the holding voltage $\pm V_H$. More specifically, there are two contributions to the dark-state problem in the prior art, one static and one dynamic, giving rise to a static light leakage and a dynamic light leakage, respectively. The static light leakage relates to the poor quality (homogeneity) of the AFLC bookshelf alignment and, as a result thereof, there are spatial variations of the direction of the effective optic axis in the sample. Thus, the effective optic axis is not along the transmission direction of one polarizer and a homogeneous black state cannot be achieved. The dynamic light leakage is due to the above-mentioned pre-transitional effect, i.e. a thresholdless response below the threshold ($\pm V_{TH}$) for the AFF transition or, equivalently expressed, from the anticlinic state to one of the synclinic states.

As the dark-state problem is directly related to the bad quality of alignment, the main effort has up to now been directed to develop and to optimize AFLC materials and polymer aligning layers, in order to improve the quality of the bookshelf alignment. However, such measures have far from solved the problems and, as will be demonstrated below, they cannot in fact solve them.

As stated above, very important industrial investments have been made in order to realize AFLC displays. In the review article A. Fukuda et al. "Antiferroelectric Chiral Smectic Liquid Crystals", J. Mater. Chem. 4, 997–1016 (1994) one full color display prototype is presented (p 1013, plate 1) representing the state of the art at that time. Alongside with the experimental and theoretical investigation of the AFLC materials and devices, an extensive chemical development has also taken place, involving the synthesis of new materials. This materials' development can be followed, during the last decade, e.g. in the patent sequence U.S. Pat. No. 5,340,498 (Arai), U.S. Pat. No. 5,723,069 (Mineta), U.S. Pat. No. 5,728,864 (Motoyama), U.S. Pat. No. 5,968,413 (Mine) and U.S. Pat. No. 6,002,042 (Mine), priority dates ranging from 1992 to December 1997.

U.S. Pat. No. 5,340,498 (Arai, priority date 1992) shows in FIG. 2 (transmittance vs. applied voltage) a relatively narrow hysterisis loop and a very strong pre-transitional effect, i.e. a substantial change of transmission from zero voltage up to 10 volts, where the distinct AFF transition takes place. This pre-transitional transmission change represents almost 15% of the total transmission change and seriously compromises the contrast. A high contrast allowing gray scale would not only require a much broader hysterisis loop, but, in particular, that the dynamic (pre-transitional) effect is essentially zero. In U.S. Pat. No. 5,723,069 (Mineta, priority 1995), the hysterisis loop shown in FIG. 1 is much broader. However, the dynamic leakage or pre-transitional effect is still considerable. Similar hysterisis curves can be found in all other relevant publications on the subject.

Sometimes the pretransitional effect is even much stronger. For instance, in the AFLC materials described by Robinson et al., Liquid Crystals 23, 309 (1997) and Liquid Crystals 25, 301 (1998), this effect is so dominant (FIGS. 3 and 4a, respectively) that it is not possible to define even an approximate threshold value for the AFF transition. These are the same materials as also described in GB 3,317,718 (Coles) from 1999. As already pointed out above in connection with FIG. 4, an AFLC display has to be driven such that there is a holding voltage $\pm V_H$ applied all time to all pixels. This means that no pixel is ever at zero voltage (V=0), but instead feels a voltage of at least $V_H$, even when it is supposed to be in the dark state. In other words, in the prior art structures the dark state can never be better than the transmission value T at $V=\pm V_H$, identified as $T_1$ in FIG. 4. As this transmission $T_1$, due to the pretransitional effect, is of the order of 1 to 2%, the contrast in the prior art has never been better than 50:1 or at most 100:1. In order to get an enhanced contrast of, e.g., 1000:1, this pretransitional effect would have to be reduced by about one order of magnitude, such that the transmission $T_1<0.1\%$. This would mean that the slowly rising part of T as a function of V starting at V=0 (i.e. the lower slope in FIG. 4) has to be essentially horizontal, along the V-axis, at least until the value V=±$V_H$. The ideal case would be that this part of the curve is essential horizontal until the AFF transition occurs. In the discussion of the present invention here, we might call such an ideal behavior a "sharp" AFF transition, or say that such a transition does occur without any, or substantially without any, pretransitional effect. However, it should be noted that such a "sharp transition" has never been achieved in the prior art.

The static and dynamic leakage for prior-art AFLCDs together limit the contrast to about 100:1 when measured on a pixel in the laboratory and to about half of this, i.e. 50:1, when measured on a real prototype, under driving conditions. If one realizes that a full size, full color liquid crystal television screen (of which there is no realization today) has to have a contrast of about 500:1 in order to be acceptable, one can thus appreciate why no commercial AFLC screen has ever been manufactured, in spite of the development of a number of prototypes of increasing performance, which have been presented between 1992 and 1997. Since the last-mentioned year, the further development of prototypes based on this device idea has essentially been shut down.

SUMMARY OF THE INVENTION

The inventors have carefully analyzed the reasons for the failure of the AFLC display principle and are now in a position to describe a solution to the problems. Especially, as it has been found that no acceptable contrast will ever be achieved if not both the static and the dynamic problems are removed or at least substantially reduced, at the same time, i.e. that both of the problems must be considered in order to solve the problem.

The invention provides "a new class" of antiferroelectric liquid crystal materials with unique intrinsic properties, which have shown to be very useful in order to solve the above-described "dark-state problem". However, as will be clearly exemplified by a number of embodiments using the inventive concept, the inventive AFLC material is not only useful for solving the "dark-state problem" in the prior-art AFLCDs, but can also be used in number of other devices and environments, including completely novel applications of liquid crystals.

In fact, these unique intrinsic properties of the inventive material may also be used directly in a case where the material is instead non-chiral.

According to one aspect of the invention, there is provided a liquid crystal device, comprising an antiferroelectric liquid crystal material (AFLC material) having smectic layers, and two substrates confining said AFLC material there between, wherein said AFLC material is uniaxial negative.

In the preferred embodiment the substrates are located at a mutual distance that is sufficiently small to accomplish a surface stabilization of said AFLC material.

According to the invention, it is possible to make the AFLC material uniaxial as a consequence of said surface stabilization and of a selected smectic tilt angle θ of said AFLC material.

In order to solve the above-mentioned dark-state problem, the AFLC material should present a molecule tilt plane parallel, or very close to parallel, to said substrates. According to the invention, this may be achieved by locating the substrates at a mutual distance which is sufficiently small to provide not only a surface stabilization of said AFLC material but also to make said molecular tilt plane parallel to said substrates.

According to the invention the smectic layers would preferably be oriented perpendicular to said substrates, possibly presenting a chevron structure.

According to another aspect, the inventive concept can be expressed as said uniaxial negative AFLC material presenting a cone axis and an optic axis, which is perpendicular to said cone axis.

According to another aspect of the invention there is provided an antiferroelectric liquid crystal device switchable between bright and dark states, said device comprising an AFLC material having a molecular tilt angle in an anticlinic state that is selected such that the extinction in said black state is substantially insensitive to a smectic layer orientation in different liquid crystal domains in the device.

According to another aspect of the invention there is provided a smectic, anticlinic liquid crystal material being uniaxial negative.

According to another aspect of the invention there is provided liquid crystal device, comprising a smectic, anticlinic liquid crystal material having smectic layers, and two substrates confining said liquid crystal material therebetween, wherein said smectic anticlinic material being uniaxial negative.

According to another aspect of the invention there is provided an anticlinic liquid crystal material presenting a negative birefringence.

According to another aspect of the invention there is provided an antiferroelectric liquid crystal material being uniaxial negative and presenting a cone axis and an optic axis oriented perpendicular to the cone axis.

According to another aspect of the invention there is provided an antiferroelectric liquid crystal device (AFLCD), comprising an AFLC material which is confined between two substrates and which is switchable between, on the one hand, a biaxial negative state having the axis corresponding to the smallest principal value of refractive index directed perpendicular to said substrates and, on the other hand, two biaxial positive states having the axis of the largest principal value of refractive index oriented parallel to the substrates.

Other characteristic features of the invention and preferred embodiments are set out in the enclosed claims.

Using an AFLC material according to the invention, under said prescribed conditions, the inventors have found that both the static and the dynamic light leakage vanish simultaneously, which gives an unprecedented contrast performance. The measured contrast can easily be made in excess of 1000:1 and is, in fact, only limited by the quality of the polarizers.

In order to give an understanding of the features, operation and advantages of the inventive AFLC device and the inventive material, a description will first be given about the inventor's insight into the reasons to the problems.

The reason for the static bad dark state can be traced to a buckling instability in the bookshelf geometry of the smectic layers. Normally, AFLC materials presents the following phase sequence for decreasing temperature:

$$\text{Isotropic–Smectic A*–Smectic C*–Smectic } C_a^*.$$

where Smectic $C_a^*$ is the antiferroelectric phase.

In the case of very small chevron angle (layers essentially upright) or with chevrons formed horizontally (along the cell plane—FIG. 7) the structure is described as quasi-bookshelf (QBS) structure.

The molecules are normal to the smectic layers in the A* phase and begin to tilt at the transition SmA*–SmC*. Finally, the molecules begin to tilt in opposite directions in adjacent layers at the transition SmC*–SmC.*. The smectic layers are formed in the smectic A* phase and the layer ordering seems to make a durable imprint on the surfaces with the corresponding periodicity. When the molecules tilt, this causes layer shrinkage. In order to fill out the resulting space, the smectic layers then buckle in the shrinking direction and, thereby, form a so-called chevron structure as schematically illustrated in FIG. 5. This (vertical) chevron structure is a well-known phenomenon in the ferroelectric C* phase. However, it has long time been believed that the same thing does not happen in the antiferroelectric $C_a^*$ phase (cf. for instance U.S. Pat. No. 5,340,498 (col. 1, line 58) or U.S. Pat. No. 5,723,069 (col. 1, line 54)). In other words, the prior art teaches that AFLC materials present chevron-free structures with the smectic planes structured mutually parallel. However, the inventors have indeed found the chevron structure also in AFLC materials, and as it turns out, the chevron phenomenon is here even more complex than in ferroelectric liquid crystals (FLCs).

Thus, when an applied field E induces the AFF transition, the local polarization P, due to the chevron structures, will not be collinear with the vertical field and will experience a torque which easily (especially for materials with high $P_s$) straightens up the layer 20 to a vertical direction, as schematically illustrated in the upper part of FIG. 6. As a final consequence of the initial chevron structure (FIG. 5) in combination with the applied electrical field E, in order to keep the density constant, the smectic layers 20 therefore have to instead create kinks 40 in the horizontal direction as schematically illustrated in the lower part of FIG. 6, giving a resulting structure of the smectic layers 20 as schematically illustrated in FIG. 7. Once these kinks 40 have been formed in the cell, they do not go back even when the electric field is removed. As a result, when looking at such a cell from above (FIG. 8) as indicated by the arrow A in FIG. 7, one will not observe any uniform layer direction and no uniform optic axis. It should be noted that this result is not due to a bad alignment technique, but an inherent consequence of the buckling instability of the material, which leads to essentially two quite different layer directions rather than one. This is schematically illustrated in FIG. 8, showing the kinked layers in FIG. 7 as seen in a direction along the smectic layers. For previously existing AFLC materials, the effective optic axis is along the layer normal z as mentioned above. Thus, with the kinked structure according to FIGS. 7 and 8 we have two different optic axis directions 42, 44 throughout the sample, and no matter how we adjust a pair of crossed polarizers, no perfect extinction state can be found. There is always light leaking through. Thus, trying to solve the problem in the conventional way by refining the alignment will not succeed. There will always be a static leakage in the dark state.

Next, the background of the dynamic light leakage will be discussed. The dynamic light leakage (as illustrated schematically in the hysteresis loop in FIG. 4) is related to the application of the electric field E. In other words, for E=0 there is no dynamic leakage. As mentioned above, the ideal situation is where the action of the electric field E does not change the direction of the molecules until the field strength corresponds to a threshold field value $E_{th}$ for the AFF transition, which in its turn should be as sharp or distinct as possible.

However, the AFF transition generally proceeds in two stages. If the tilt plane of the anticlinic order is strictly parallel to the cell plane, then the local polarization vectors (±P in adjacent layers) are collinear with the applied field E, and thus the applied field does not exert any torque (E×P) on the molecules. However, when the applied field is increased, at some value the tilt plane starts to bend out in the middle of the cell. This is a kind of instability phenomenon in liquid crystals, known under the name "Frederiks transition". An important characteristic of all Frederiks transitions is that the instability occurs at a given voltage value, not at a given field. In other words, whereas the threshold for the transition anticlinic→synclinic is a field threshold $E_{th}$, this is a voltage threshold here referred to as $V_f$. If d is the cell thickness, this means that the transition takes place at a field $E_f$, given by:

$$E_f d = V_f = \text{const.} \quad (1)$$

Hence, in order for this AFF transition to take place, we have to apply a field that is inversely proportional to the cell thickness d:

$$E_f \sim 1/d \quad (2)$$

Another characteristic of a Frederiks transition is that, if the ideal cell geometry is not fulfilled, such that the P vectors are not strictly collinear with E, the small existing torque already at the beginning will remove a sharp threshold, so that the transition actually takes place continuously, starting out already at zero voltage. This result is in fact what can be observed when studying the above-mentioned figures in U.S. Pat. Nos. 5,340,498 and 5,723,069, respectively. A non-ideal cell geometry also includes the case of incomplete surface-stabilization, i.e. where there is incomplete helix unwinding.

According to the invention, there is provided a new class of AFLC material. More, specifically, the inventors have found that the long-standing problem of light leakage in the dark state of AFLCDs can be eliminated by using a new class of AFLC materials, and submitting the liquid crystal to certain restrictive conditions in the cell. These conditions mean that the inventive AFLC material, in order to solve the dark-state problem, has to be in a confined state (to be discussed below) in order to acquire the desired properties.

The AFLC materials of this "new class" according to the invention have significantly larger molecular tilt angle than the conventional AFLC materials used so far. Here, the term "molecule tilt angle" refers to the angle between the molecules and the cone axis in anticlinic state, such as indicated in FIG. 3b, i.e. an anticlinic-state tilt angle. More specifically, conventional AFLC materials have a molecular tilt angle θ in the range of 25° to 30° and at most 35°. For instance, the molecule tilt angle θ in FIGS. 1, 2 and 3b would be around 25°. In contrast thereto, the new class of AFLC material according to the invention has molecular tilt angles θ in the range of 40° to 50° with a preferred interval of 42° to 48°. The inventors have termed this inventive new class of high tilt AFLC materials as ORTHOCONIC AFLCs after the prime case of θ=45° giving a smectic cone angle of 90°. Put in other words, the molecules have in principle the freedom to lie on and move around a cone, the tilt cone. For a tilt angle θ of 45°, this cone has a 90° top angle (2θ), hence the name orthoconic.

In fact, unique to the class of orthoconic AFLC materials are their unexpected and extraordinary optical properties. The inventors have surprisingly found that when the molecular tilt angle θ of an AFLC material increases monotonically toward the value 45° (cf. FIG. 13), the optical properties change in a very non-monotonic way. The inventors have succeeded to create a material which has a stable anticlinic $C_a^*$ structure with these unique properties over a temperature interval of more than 70°. Such a material can be manufactured by mixing AFLC compounds, which individually have no extraordinary properties.

This material constitutes the first surface-stabilized AFLC material ever with negative birefringence. It is in general biaxial negative in an interval around θ=45° with the special case of being uniaxial negative for that angle. In a reasonably small interval around 45° it can to a good approximation be considered uniaxial (uniaxial approximation) Hence, its optic indicatrix has the same oblate shape as a cholesteric liquid crystal in this case. In the context of the present invention, the term "uniaxial negative" will thus include not only the exactly or strictly uniaxial negative case where the principal values of the three refractive indexes $n_\alpha$, $n_\beta$, $n_\gamma$ are such that $n_\alpha < n_\beta = n_\gamma$ ($n_\alpha$ being in the direction of the effective optic axis). The expression "uniaxial negative" also encompasses an uniaxial approximation (i.e. slightly biaxial) where $n_\alpha < n_\beta \approx n_\gamma$, where $n_\beta$ and $n_\gamma$ are sufficiently close to each other so that the optical properties and the operation of the device would be equivalent to the strictly uniaxial case.

What is also unique to the invention is that the effective optic axis of the inventive AFLC material in its anticlinic state is perpendicular to the tilt plane. In contrast, conventional AFLCs in their anticlinic state are biaxial positive and present an effective optic axis lying in the tilt plane. This corresponds to a somewhat flattened cigar-shaped optic indicatrix (prolate) where $n_\alpha < n_\beta << n_\gamma$, the effective optic axis being along the $n_\gamma$ direction and along the smectic layer normal (cf. FIG. 12a). If one now recalls that the reason for the static leakage was the kinked structure as described in connection with FIGS. 7 and 8, leading to two effective optical axes 42, 44, one will se that the optic axis of the inventive material in the anticlinic state will be insensitive (cf. FIG. 12b) to those changes of the layer direction as indicated at 40 in FIGS. 7 and 8 and, therefore, the static light leakage is eliminated. In order words: the kinked structure in FIGS. 7 and 8 may still remain when using the invention, but the static leakage will be eliminated.

However, it should be noted that the optic axis would be perpendicular to the cell plane only if the tilt plane is strictly parallel to the cell plates, i.e. if the "horizontal tilt plane condition" is fulfilled. The inventors have shown that in order to achieve the horizontal tilt plane condition, normal "surface-stabilization" is not sufficient. In fact, all prior-art experiments describing the AFLC device principle have been made on cells that are assumed to be surface-stabilized, in the generally adopted meaning that the helical superstructure is absent. This has been assured by using a cell thickness of the same order of magnitude as the pitch of the helix or, vice versa, at a standard cell thickness of about 2 μm, by adjusting the pitch of the AFLC to that size. However, even when no helix is present, it is still not assured that "the horizontal tilt plane condition" is obtained, namely that the anticlinic tilt plane is parallel, or close to parallel, to the cell plane. If it is not, the inventive optical properties described above are lost and light leaks through. If the horizontal tilt plane condition is not assured, in spite of the absent helix, it will however be assured, as the inventors have found, by further decreasing the cell thickness, i.e. decreasing the spacing between the substrates. At present this cannot easily be quantified, as it not only depends on the pitch but on the polarization of the material, as well as on the polar properties of the bounding surfaces. In the case of our orthoconic material, from the observation of the striking excellent dark state obtained we could conclude that we obtained the horizontal tilt plane condition.

The horizontal tilt plane condition discussed above in relation to the static leakage has also two immediate effects relating to the dynamic leakage problem. First of all, $E_f$ attains a non-zero value. If $E_f << E_{th}$, there will be a considerable dynamic light leakage before the field has increased to the value $E_{th}$ when the transition occurs to the synclinic, ferroelectric state. But equation (2) above tells us that we can always increase $E_f$ by decreasing the cell thickness d. The optimum condition obviously corresponds to a d-value making $E_f = E_{th}$. If $E_f = E_{th}$ we have no pretransitional effect at all, and we will then find the first part of the hysterisis curve to start out horizontally along the V-axis and only take off at the AFF transition, as referred to above as the case having a "sharp" AFF transition. The hysteresis curves in the figures referred to above in U.S. Pat. No. 5,340,498 and U.S. Pat. No. 5,723,069 indicate that the "horizontal tilt plane condition" was not at all fulfilled in these cells, although they were assumed to be surface stabilized, i.e. with no helix.

In a smectic anticlinic material, the molecules have in principle the freedom to lie on and move around a cone, the tilt cone. For a molecular tilt angle θ=45°, this cone has a 90° top angle (2θ). In one aspect regarding "orthoconic material", orthoconic smectic materials thus are characterized by a tilt angle of 45° or near that value. If the material is non-chiral, the horizontal condition can be said to be automatically fulfilled, and the orthoconic smectic is then uniaxial negative, i.e. it has a negative birefringence.

In the probably much more important application of the invention, namely the case where the orthoconic, smectic material is chiral and thus also antiferroelectric, the horizontal tilt plane condition is not automatically fulfilled. When it is, however, the material acquires the same properties of being uniaxial negative with the optic axis perpendicular to the tilt plane, i.e. perpendicular to the cone axis. As the horizontal tilt plane condition is a necessary condition for the unique optical properties, it is convenient to include it in the definition of orthoconic AFLCs. This may also be expressed more simply by stating that orthoconic AFLC materials presents the particular property of the optic axis being orthogonal to the cone axis. A tilt angle of 45° or near 45° per se is not enough, because a 45° AFLC material in itself is uniaxial positive, with the optic axis directed along the layer normal z.

An orthoconic AFLC in horizontal condition is not only unique in that it has a negative birefringence. By application of an external field, its effective optic axis can be switched between three orthogonal_directions. To the inventor's knowledge, no such electrooptic material exists in the prior art, whether in liquid or solid crystals. There are numerous optical applications of this property, with or without polarizers.

In the case the invention is implemented as an AFLC device where the orthoconic AFLC is used between (normally) crossed polarizers, it is worth to point out that not only the black state is improved enormously, but also the bright state is optimized.

The orthoconic material is extremely attractive not only for transmissive devices (e.g. displays) but in particular for reflective displays, of which so far no prototype has been presented. In both cases, several device modes can be imagined with various passive and/or active optical components added. The simplest of these constitute (normally) crossed circular polarizers that offer some advantages in manufacturing because they do not need to be adjusted.

The first theoretical investigation of the optical properties of an anticlinic smectic with θ=45° was made by B. Cvikl, D. Moroi, W. Franklin, Mol. Cryst. Liq. Cryst. 12, 267

(1971) with the only conclusion that the structure is biaxial. In the experimental paper from the year before, T. R. Taylor, J. L. Fergason, S. L. Arora, Phys. Rev. Lett. 24, 359 (1970) is found the statement that $n_1$ and $n_2$, the effective refractive indices in the tilt plane, would be nearly equal for $\theta=45°$. That they actually are equal is stated in A. de Meyere, J. Fournier and H. Pauwels, Ferroelectrics 181, 1 (1996), who point out that in this case the black state is independent of the setting of the polarizers. In the chapter "Optical Properties of Ferroelectric and Antiferroelectric Liquid Crystals", by D. C. Ulrich and S. J. Elston, in S. Elston and R. Sambles (editors) "The Optics of Thermotropic Liquid Crystals", Taylor & Francis, 1998, an (incorrect) formula is given (page 214) which would single out the value $\theta=45°$ if it were inserted. Finally, in R. Beccherelli and S. J. Elston, Liquid Crystals 25, 573, (1998) the (correct) formula for the refractive indices $n_1$ and $n_2$ is given, but without any remark related to $\theta=45°$.

The first AFLC material with a tilt $\theta$ close to 45° was reported in A. M. Levelut et al., J. Phys. Paris, 44, 623 (1983). This material, now commonly called MHTAC, was reported to have a tilt as high as 48° measured by X-ray diffraction (A tilt measured by this technique commonly differs somewhat from the optically measured tilt.). The antiferroelectric properties of MHTAC were discussed in Y. Galerne and L. Liebert, Phys. Rev. Lett. 64, 906 (1990). The electrooptic properties were investigated in great detail by P. E. Cladis and H. R. Brand, Liquid Crystals 14, 1327 (1993) and, with particular emphasis on use in AFLC displays, by Y. Takanishi et al, Jpm. J. Appl. Phys, 32, 4605 (1993). In this later work the so-called tri-stable switching is studied and a somewhat lower value of the tilt is reported than the one crystallographically determined. The pretransitional effect is distinctly observed in the transmittance curves. In none of these references is any mentioning of unusual or extraordinary optical or electrooptical properties.

MHTAC has the $C_a^*$ phase in the temperature interval from 95° C. to 130° C. and is thus unsuitable for devices. The first report of an AFLC material with the tilt value $\theta=45°$ in a larger temperature interval is found in GB 2,317,186 (Coles, priority date 1996). Because of the use of certain siloxane groups that normally prevent the appearance of both orthogonal and tilted smectic in the same compound, a tilt angle of 45° can be achieved over a very wide temperature range. However, when it is used in the AFLC display mode, the contrast is stated as 100:1, i.e. the same value as for conventional AFLC materials. The demonstrated contrast values have actually been much lower than this. As is also clear from FIG. 3 in W. K. Robinson, P. S. Kloess, C. Carboni and H. J. Coles, Liquid Crystals 23, 309 (1997) these materials show a huge pre-transitional effect. Thus it is not sufficient to have a surface-stabilized AFLC material with $\theta=45°$ in order to achieve a high contrast. The reason for this and the difference between the material in GB 2,317,186 and the material in the present invention will be clear from the discussion in the next section. But we can already state here that the British 45° AFLC has its optic axis essentially in the tilt plane and not perpendicular to it as in the present invention. It therefore does not belong to the category of orthoconic AFLCs, as we have defined it but has properties that are essentially the same as those of conventional AFLC materials with much lower $\theta$ values.

It is now instructive to deduce the properties of the inventive orthoconic materials.

Let us first study the basic optical properties of the surface-stabilized AFLC cell as a function of $\theta$ in terms of the dielectric tensor. The helix is first of all suppressed by surface forces (planar anchoring conditions but with no preferred sign of $\theta$) and, secondly, we assume that even the invisible traces from less than perfectly unwound helix are absent, such that the director is everywhere parallel to the cell glass plates. The wavelength of incident light is two orders of magnitude larger than the scale of the smectic layer structure. The light will therefore see a dielectric tensor $\in_{AF}(\theta)$ which is the average of the two tensors $\in_{+\theta}$ and $\in_{-\theta}$ representing the two sets of smectic layers, i.e. $\in_{AF}(\theta)= ½(\in_{+\theta}+\in_{-\theta})$. To calculate $\in_{\pm\theta}$ we start with the local dielectric tensor $\in'$ of one set of layers represented in the molecular frame by a diagonal matrix $$\varepsilon' = \begin{pmatrix} \varepsilon_1 & 0 & 0 \\ 0 & \varepsilon_2 & 0 \\ 0 & 0 & \varepsilon_3 \end{pmatrix} \quad (3)$$

In the x, y, z frame, this tensor is given by $\in_\theta = U\in'U^{-1}$ where U is the rotation matrix $$U = \begin{pmatrix} \cos\theta & 0 & \sin\theta \\ 0 & 1 & 0 \\ -\sin\theta & 0 & \cos\theta \end{pmatrix} \quad (4)$$

for a rotation through an angle $\theta$ around the y-axis. This gives $$\varepsilon_\theta = \begin{pmatrix} \varepsilon_1\cos^2\theta + \varepsilon_3\sin^2\theta & 0 & (\varepsilon_3 - \varepsilon_1)\sin\theta\cos\theta \\ 0 & \varepsilon_2 & 0 \\ (\varepsilon_3 - \varepsilon_1)\sin\theta\cos\theta & 0 & \varepsilon_1\sin^2\theta + \varepsilon_3\cos^2\theta \end{pmatrix} \quad (5)$$

for one set of smectic layers with tilt $\theta$. Correspondingly, we get $\in_{-\theta}$ when replacing $\theta$ by $-\theta$. The effective dielectric tensor is then $$\varepsilon_{AF} = \begin{pmatrix} \varepsilon_1\cos^2\theta + \varepsilon_3\sin^2\theta & 0 & 0 \\ 0 & \varepsilon_2 & 0 \\ 0 & 0 & \varepsilon_1\sin^2\theta + \varepsilon_3\cos^2\theta \end{pmatrix} \quad (6)$$

This tensor shows that, in general, a surface-stabilized antiferroelectric liquid crystal is a biaxial medium with a common projection of the two crystallographic optic axes onto the cell plane parallel to the local smectic layer normal z (This holds for $\theta<45°$. For $\theta<45°$, the plane of the two optic axes is, in fact, parallel to the smectic layers.

Now let $\theta=45°$ in (6) above, i.e. consider an AFLC material where the director is orthogonal in alternate layers. Then we get $$\varepsilon_{AF}(\theta = 45°) = \begin{pmatrix} \bar{\varepsilon} & 0 & 0 \\ 0 & \varepsilon_2 & 0 \\ 0 & 0 & \bar{\varepsilon} \end{pmatrix} \quad (7)$$

where $\bar{\in}=(\in_1+\in_3)/2$. The tensor $\in_{AF}(\theta=45°)$ is diagonal with two of the components equal, which means that it is now uniaxial. Furthermore, the optic axis is now along the y direction, i.e. a surface-stabilized AFLC material with $\theta=45°$ is uniaxial with its optic axis perpendicular to the cell glass plates. Its two refractive indices are $n_\alpha=\sqrt{\bar{\in}}$ and $n_\beta=\sqrt{\in_2}$.

FIGS. 9 and 10 are geometric representation of the dielectric tensor of a 45 degree SSAFLC material in its anticlinic state (no electric field applied). To the left in the figures, the prolate dielectric tensors 50, 52 are shown for each set of the smectic layers. By averaging the prolate dielectric tensors 50, 52 of two sets of layers with opposite tilt angle, we obtain an circular oblate tensor 54 of the anticlinic structure (right in FIGS. 10 and 11), presenting an effective optic axis 56 along the y direction, i.e. perpendicular to the tilt plane and perpendicular to the cell substrates 12, 14. The principal values of the three refractive indexes $n_\alpha$, $n_\beta$, $n_\gamma$ would satisfy the condition $n_\alpha < n_\beta = n_\gamma$ ($n_\alpha$ in the y-direction, $n_\beta$ in the x direction and equal to $n_\gamma$ in the z-direction) for obtaining a negative unaxial optical indicatrix and no birefringence ($n_\beta = n_\gamma$) in the cell plane (i.e. the oblate tensor 54 will have a circular cross section 58 in the xz plane). Light incident along the y direction will thus travel along the optic axis 56, hence being unaffected by the presence of the liquid crystal, independently of the direction of the smectic layer normal z in the plane of the cell.

FIG. 11*a* to 11*c* schematically illustrates the optical indicatrix of the inventive the AFLC material inside an AFLC device. In the anticlinic zero-field situation (FIG. 11*b*), we get the oblate indicatrix 54 as already illustrated to the right in FIGS. 9 and 10. However, in the two synclinic, ferroelectric field-on states ($-E_{th}$ and $+E_{th}$), we get prolate tensors 60 and 62, respectively, with their effective optic axis 64 and 66, respectively, directed in the cell plane.

FIG. 12*a* schematically illustrates how the misalignment of the smectic layers 20 in a conventional AFLCD in its zero-field condition with tilt angles of about 30 degrees causes the effective optic axis 70, 72 to fluctuate in the plane of the cell, which leads to light leakage and a bad dark state in the zero-field condition. In contrast, the surface stabilized orthoconic AFLC, as schematically illustrated in FIG. 12*b*, has its optic axis 56 perpendicular to the substrates in the surface stabilized orthoconic AFLC as schematically illustrated in FIG. 12*b*, has its optic axis 56 perpendicular to the substrates 12, 14 and, hence, a perfect dark state is achieved independent of any layer misalignment.

Summing up the electro-optic properties of the surface-stabilized orthoconic AFLC: at zero field the optical indicatrix is an oblate, ellipsoid (54) with the effective optic axis (56) perpendicular instead of parallel to the substrates in the surface-stabilized geometry, whereas in the switched state the indicatrix is a prolate ellipsoid (60, 62) with the effective optic axis (64, 66) parallel to the substrates and at 45° to the smectic layer normal z. The switched state is thus the optimum transmission state. This means that even the transmission in the bright state is improved by choosing θ to 45° or close to this value.

The tensor addition described above also illustrates why the 45° material as disclosed in GB 2,317,186 does not have the same properties. In this case the mesogenic units are connected to each other by a long siloxane unit (the length of this unit exceeds that of the mesogenic unit). In the tensor addition we would now have to add three tensors, the third one corresponding to the siloxane unit. Whatever principal dielectric values this third tensor may have, it is clear that this further addition would give a positive biaxial tensor as a result. In general, we would expect a contribution along the direction of the siloxane chain unit making the effective optic axis to lie in the tilt plane and counteracting the compensation of the polarizabilities due to the orthogonal mesogenic units. Thus, the optical properties would correspond to the conventional properties of AFLC materials with a lower tilt.

We may illustrate the change in optical properties as we continually increase the tilt angle θ in a hypothetical anticlinic structure confined to a plane. FIG. 13*a* to 13*d* show the results of our calculations based on the reasonable values $n_1 = 1.50$, $n_2 = 1.51$, and $n_3 = 1.65$ at θ=45° for the synclinic states.

DESCRIPTION OF EMBODIMENTS OF THE INVENTION

The invention will now further be described with reference to some examples and embodiments with reference to the enclosed drawings, in which FIG. 1 is a schematically side view of a small part of a prior-art AFLC device;

FIG. 2 is a schematically perspective view of a small part of a prior-art AFLC device;

FIG. 3 schematically illustrates a switching operation of a prior-art AFLC device;

Figure 9:
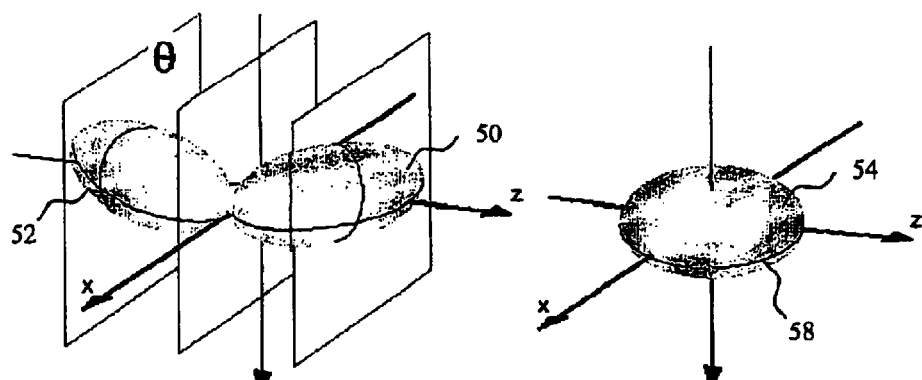
FIG. 9 is a schematically explanation of the oblate optic indicatrix of an inventive uniaxial negative AFLC material.
Figure 10:
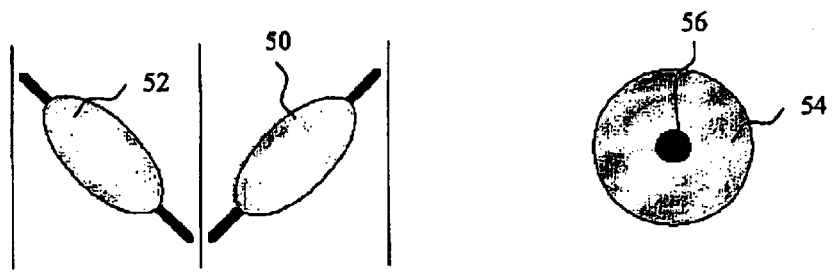
Figure 12A:
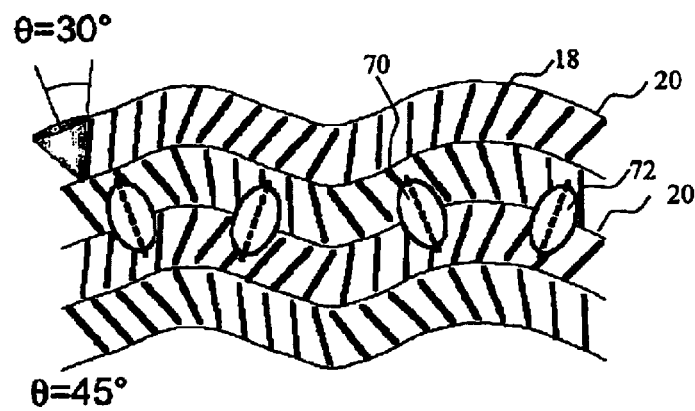
Figure 12B:
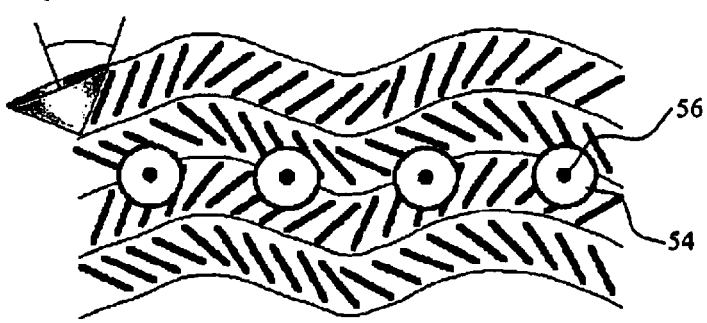

FIG. 10 corresponds to FIG. 9 and illustrates the indicatrix in the direction of the optic axis;

FIG. 11 schematically illustrates the form and direction of the optic indicatrix of an uniaxial negative AFLC material when switched between different states;

FIG. 12*a* schematically illustrates the different directions of the effective optic axis in a prior-art AFLC material;

FIG. 12*b* schematically illustrates the uniform direction of the effective optic axis in a uniaxial negative AFLC material according to the invention;

FIG. 13 illustrates (in sequence A–D) the results of a calculation on how the optical properties change when continually increasing the tilt angle θ. In the figure, the effective optic axis (dashed lines) is shown in relation to the crystallographic optic axes (solid lines).

Figure 14:
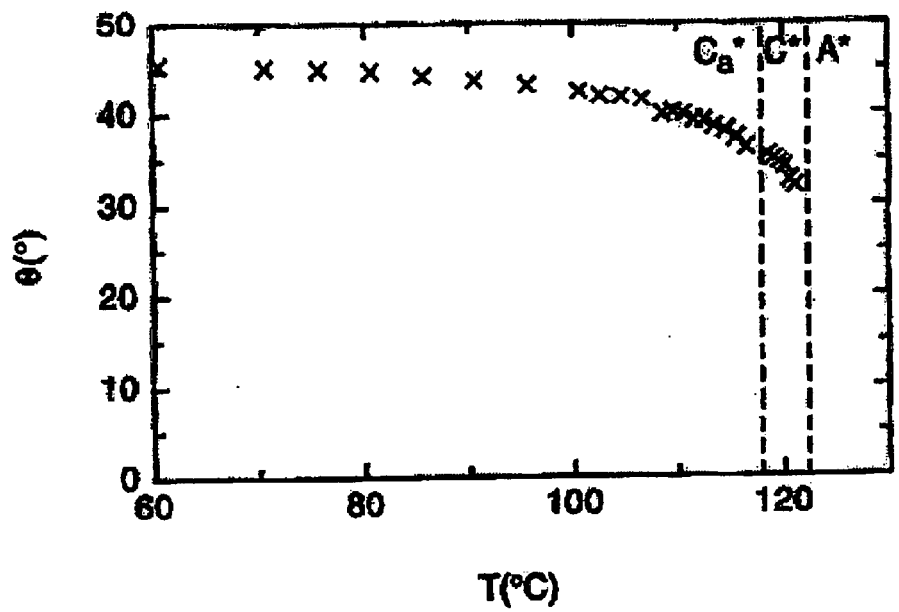
Figure 15:
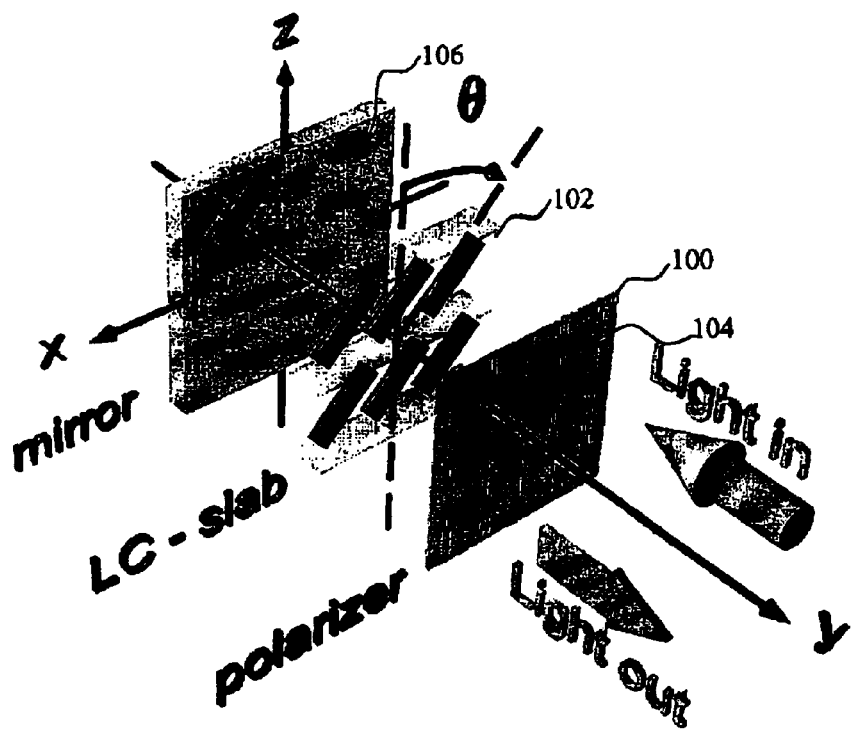
Figure 16:
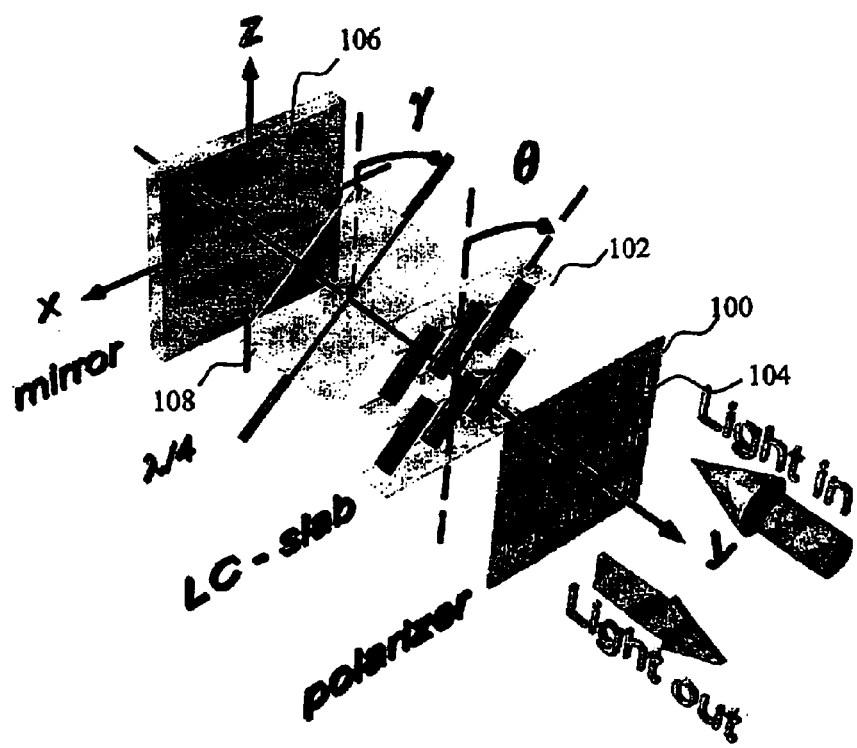
Figure 17:
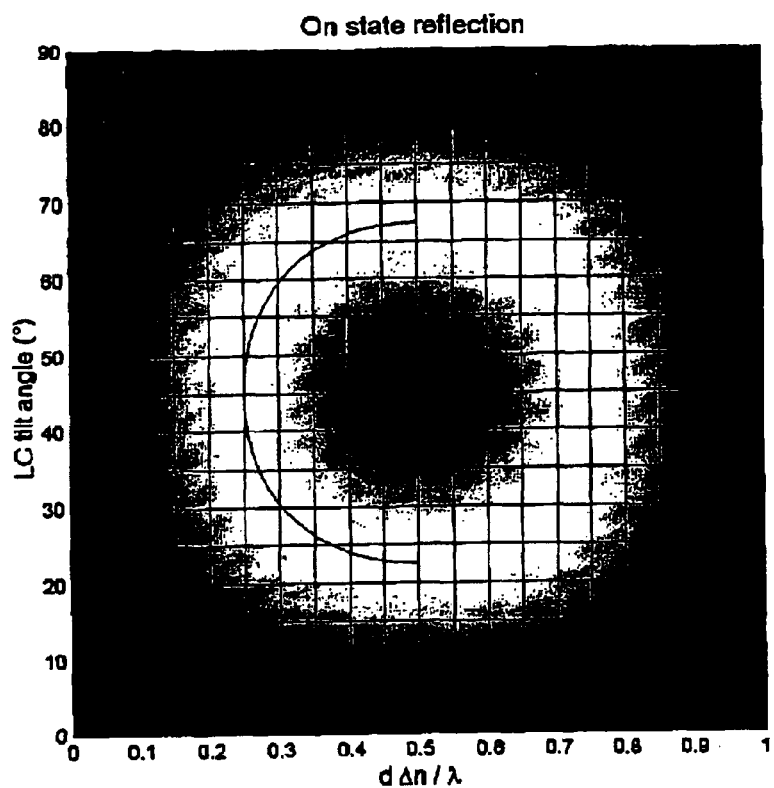

FIG. 14 is a diagram illustrating a measured tilt angle θ of an example of an AFLC material according to the invention;

FIG. 15 is a schematic representation of an embodiment of a normally-white mode reflective display according to the invention;

FIG. 16 is a schematic representation of a first embodiment of a normally-black mode reflective display according to the invention;

FIG. 17 visualizes how the reflection depends on the tilt angle and the thickness in the field-on conditions of the normally-black mode in FIG. 16 (eq. 12).

Figure 19:
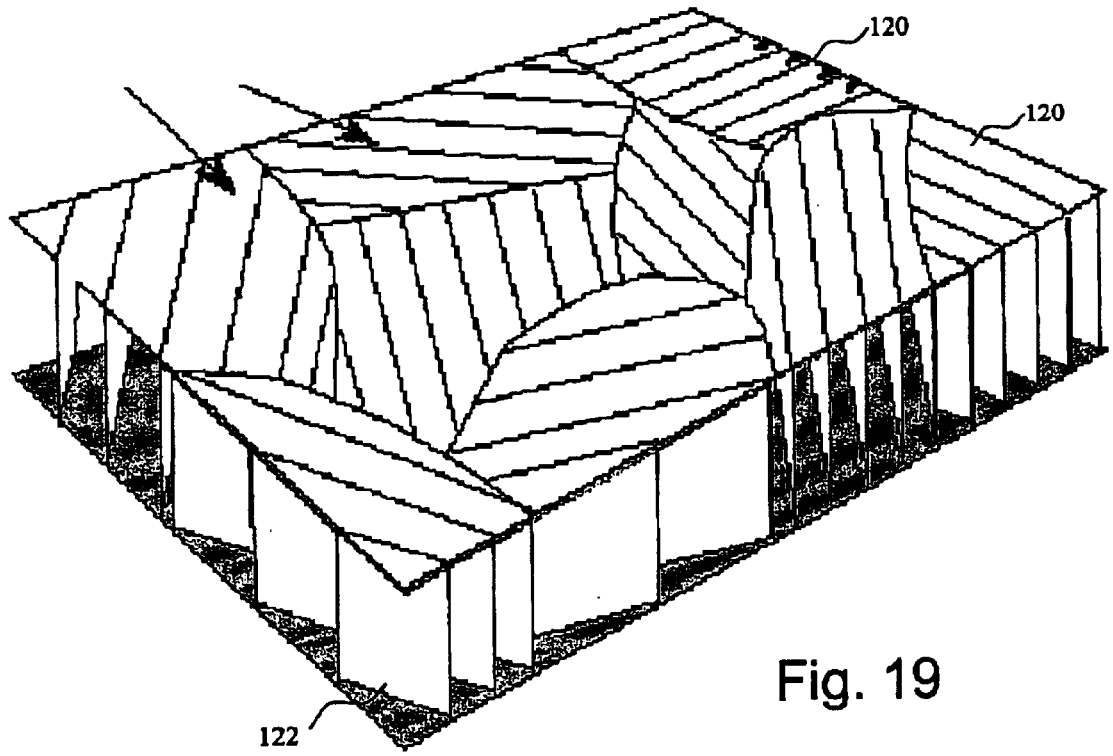
Figure 18:
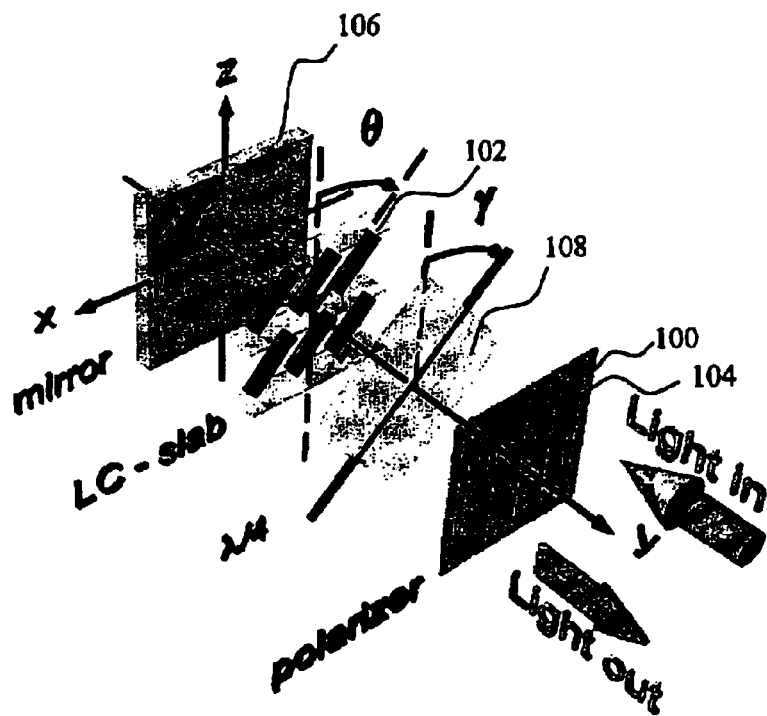
Figure 20:
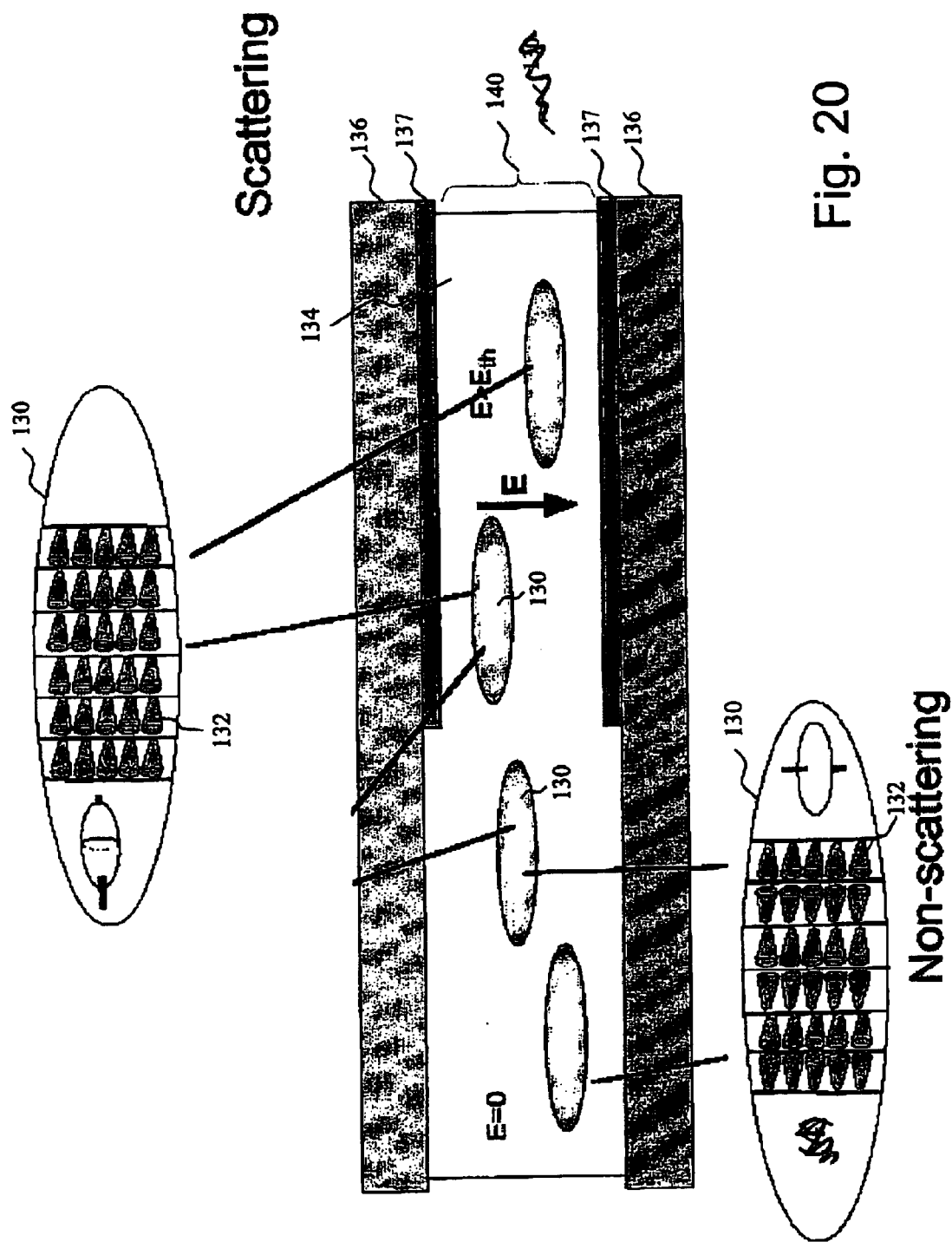
Figure 21:
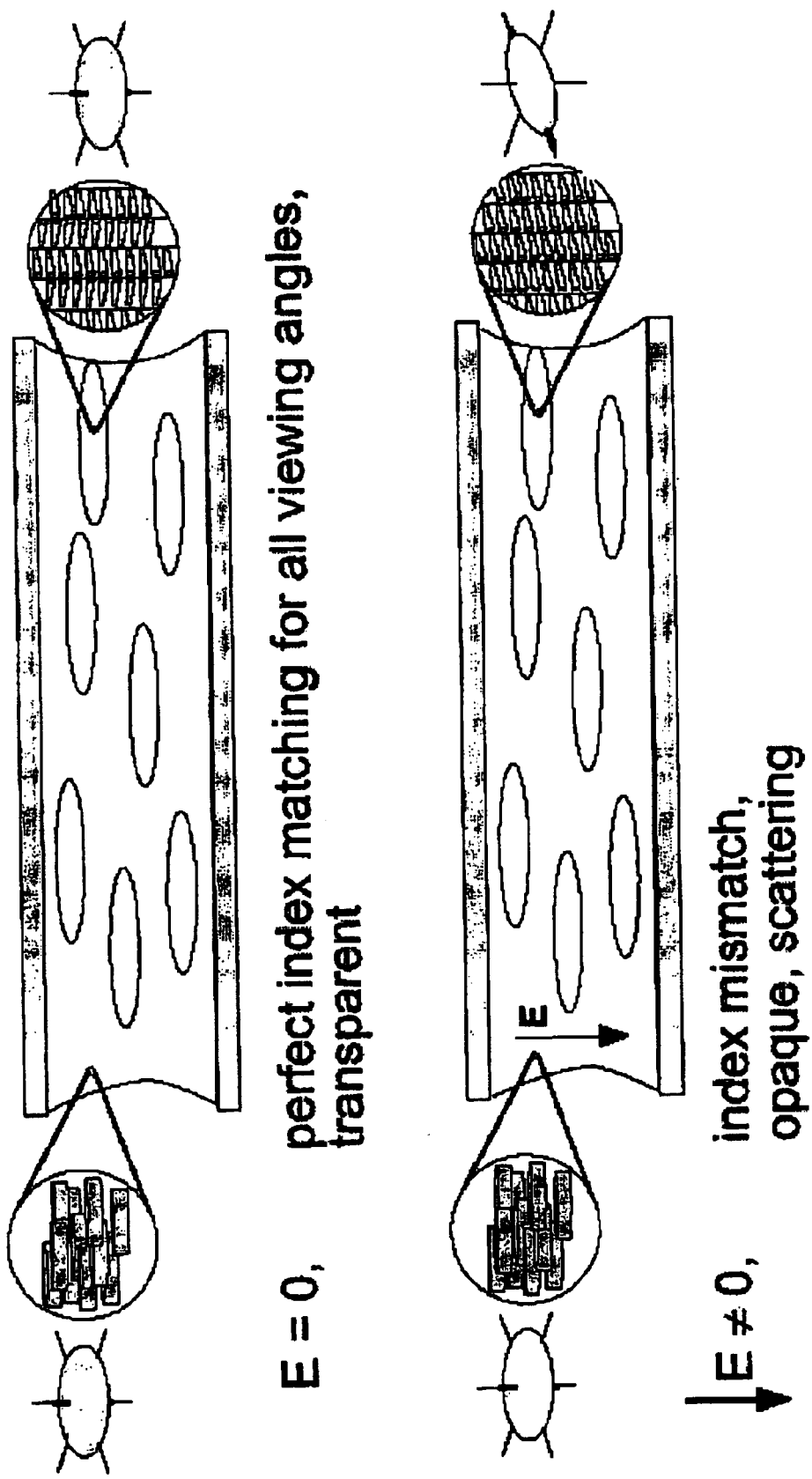
Figure 22:
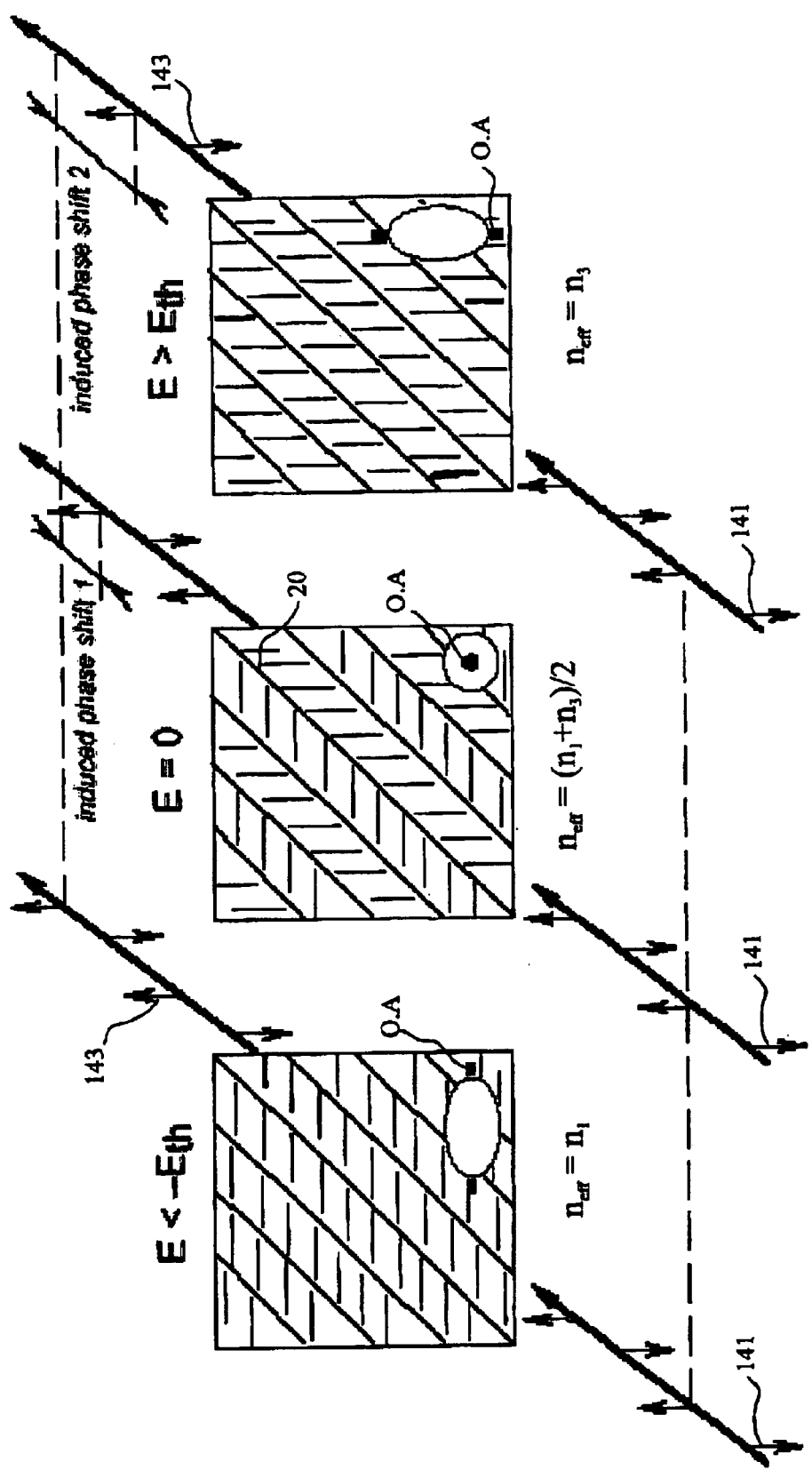
Figure 23:
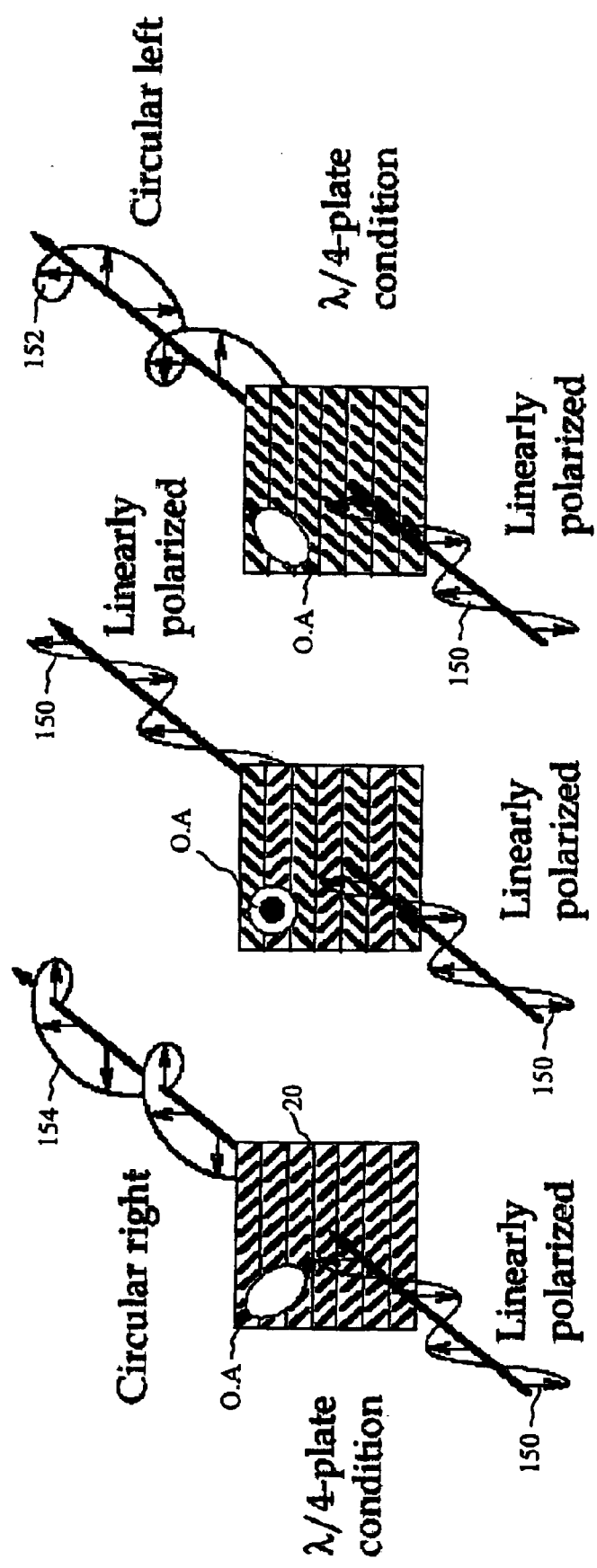

FIG. 18 is a schematic representation of a second embodiment of a normally-white mode reflective display according to the invention;

FIG. 19 schematically illustrates small domains in an AFLC scattering device;

FIG. 20 is a schematic representation of a first type of a polymer-dispersed orthoconic AFLC device;

FIG. 21 is a schematic representation of a second type of a polymer-dispersed orthoconic AFLC device;

FIG. 22 schematically illustrates the operation principle of a phase-only modulator according to an embodiment of the invention; and FIG. 23 schematically illustrates the operation principle of a polarization switch according to an embodiment of the invention.

Figure 1:
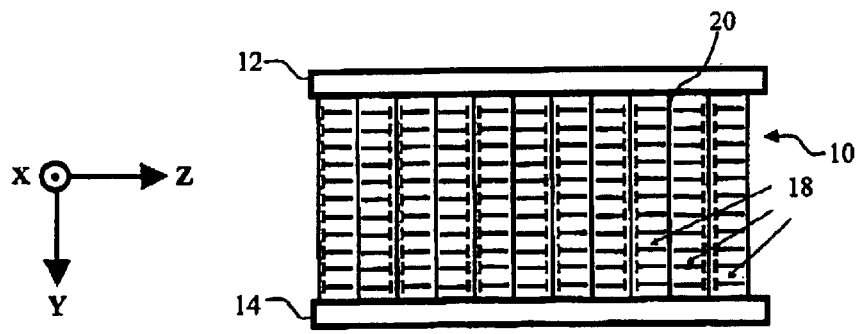
Figure 2:
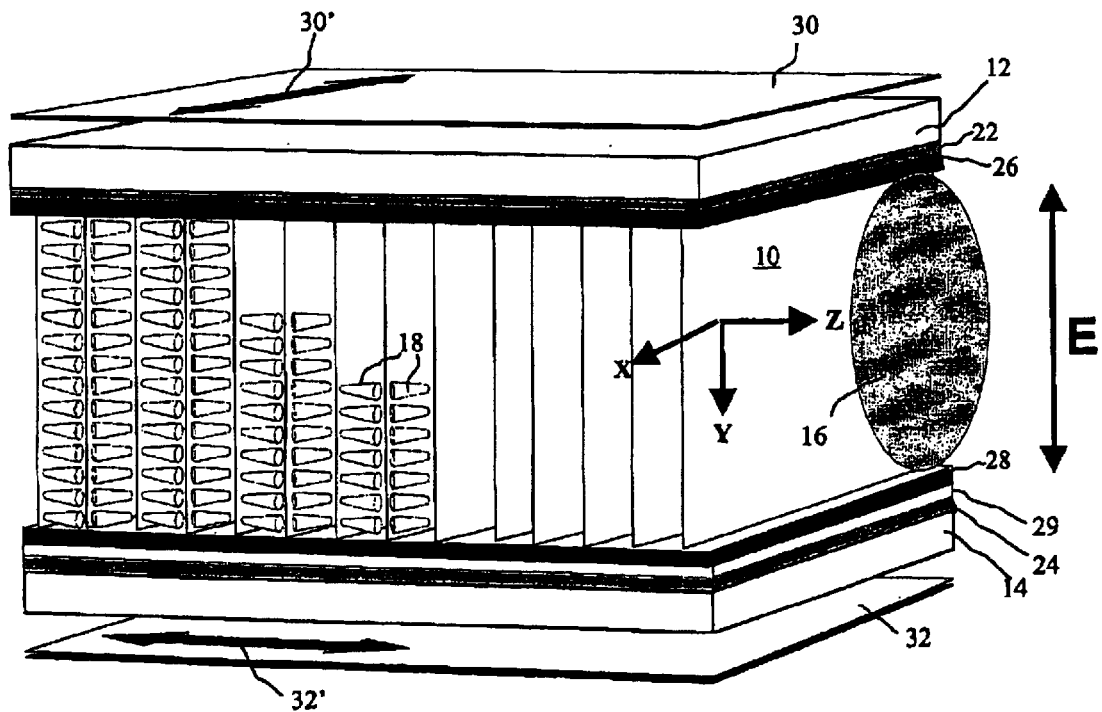
Figure 3A:
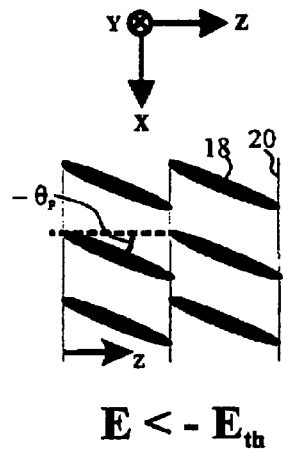
Figure 3B:
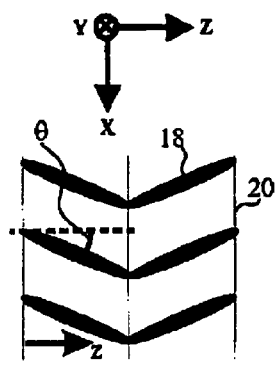
Figure 3C:
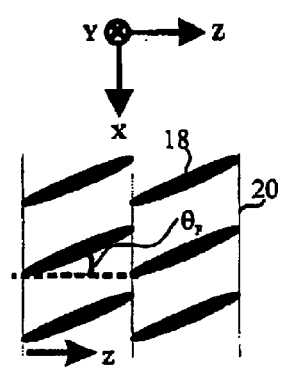

First, it should be noted that an embodiment of the present invention in the form of a liquid crystal display may preferably be structured essentially as the prior-art display structure described above in connection with FIG. 2. Therefore, the detailed structure and the operation of such a device according to the invention thereof will not be repeated, and reference could be made to the structure in FIG. 2.

The first orthoconic smectic, which we call W107, was achieved by mixing four different fluorinated AFLC compounds in the proportions shown in Table 1 below.

TABLE 1

Composition of the mixture W107.

| % wt | Molecule |
|---|---|
| 6.31 | $F_3C(CH_2)_2COO(CH_2)_3O$—⟨⟩—⟨⟩—COO—⟨⟩—COO$\overset{*}{C}HC_6H_{13}$ / $CH_3$ |
| 20.77 | $F_7C_3COO(CH_2)_3O$—⟨⟩—⟨⟩—COO—⟨⟩—COO$\overset{*}{C}HC_6H_{13}$ / $CH_3$ |
| 32.45 | $F_{15}C_7COO(CH_2)_3O$—⟨⟩—⟨⟩—COO—⟨⟩—COO$\overset{*}{C}HC_6H_{13}$ / $CH_3$ |
| 40.47 | $F_7C_3COO(CH_2)_4O$—⟨⟩—⟨⟩—COO—⟨⟩—COO$\overset{*}{C}HC_6H_{13}$ / $CH_3$ |

The phase transition temperatures of the mixture were measured with Pyris 1 DSC equipment. The phases were checked by polarizing microscopy. The transitions, upon heating were found to be K–27.4–SmCa*–119.5–SmC*–121.6–SmA*–132.3–I, were K designates crystal and I designates isotropic phase. As can be seen in FIG. 14, the anticlinic Ca* phase is stable in an interval of more than 90° C., which is more than sufficient for display applications. In fact, the mixture is easily supercooled below 27.4° C., which facilitated the first studies on W107 at room temperature. Later, several similar mixtures have been made with various compositions, among them, such with stability interval including room temperature. In fact, such shifts are easy to make for those skilled in the art, once the basic mixing rules have been found out. The most important of these rules is that the Smectic A* to Smectic C* transition has to be first order, not second order as it is in the majority of cases. It is practically excluded to make 45° AFLC materials with a second order SmA*–SmC* transition, because the tilt typically saturates around 25° in the C* phase and does not increase very much further in the underlying $C_a^*$ phase. In the mixture, W107, the A*–C* transition is strongly first order, with an immediate jump in θ to 32°. The sharpness of the transition is clearly shown in FIG. 14, showing the tilt angle θ as a function of the temperature. As can be seen, the tilt now saturates at a value of 45° to 46° when the temperature is decreased. It may be added that the optical tilt angle changes with about 0.5° to 1°, depending on which part of the visible spectrum (blue to red) it is measured in. This is a common feature of all tilted smectic materials.

It has turned out, so far, to be impossible to achieve a homogeneous bookshelf alignment of AFLC materials and, hence, there are always static fluctuations in the smectic layer normal z and, thereby, also in the effective optic axis in the plane of the cell. Therefore the polarizer axis and the effective optic axis of the liquid crystal do not coincide. The absolute average value of the deviation between the two is often 5° or even 10°. Consequently, in the prior art there is an inevitable light leakage in the dark state that means that the contrast of existing AFLC prototype displays is seriously limited. The effective birefringence in the plane of the cell of the surface stabilized AFLC layer is given by:

$$\Delta n_{effective} = \sqrt{n_3^2\cos^2\theta + n_1^2\sin^2\theta} - \sqrt{n_3^2\sin^2\theta + n_1^2\cos^2\theta} \quad (8)$$

where $n_3$ and $n_1$ are the principle refractive indices in the molecular frame of the synclinic states.

We know that the normalized transmission T for a birefringent plate between crossed polarizers is $$T = \sin^2 2\phi \sin^2\left(\frac{\pi d \Delta n}{\lambda}\right) \quad (9)$$

where φ is the in-plane angle between the effective optic axis and the polarizer axis, d is the thickness of the plate, Δn the birefringence, and λ the wavelength in vacuum.

We can from (8) and (9) estimate the theoretical light leakage for a surface-stabilized AFLC by letting φ correspond to the average absolute deviation of the effective optic axis from the polarizer axis (misalignment) and Δn correspond to $\Delta n_{effective}$ for the AFLC layer. Some examples are given below for $n_1=1.5$ and $n_3=1.65$. The cell thickness d is tuned to correspond to a half-wave plate for the field induced synclinic states. The static light leakage is denoted $T_1(0)$. The resulting contrast as calculated is given in the following table. The tilt of 35° corresponds to the highest value ever used for an AFLC display prototype. Empirically, a misalignment not larger than 10° but more close to 5°, seems to be achievable.

TABLE 2

Calculated light leakage in the dark state and theoretical achievable contrast for conventional surface-stabilized AFLC devices, under the assumption of zero pretransitional effect.

| Tilt angle θ | Misalignment φ | $T_\perp(0)$ | Contrast |
|---|---|---|---|
| 30° | 15° | 12.5% | ≈8:1 |
| 35° | 15° | 6.6% | ≈15:1 |
| 30° | 10° | 5.9% | ≈17:1 |
| 35° | 10° | 3.1% | ≈32:1 |
| 30° | 5° | 1.5% | ≈67:1 |
| 35° | 5° | 0.8% | ≈125:1 |

Up till now the efforts in increasing the contrast of AFLC displays have been mainly concentrated to the question of decreasing the spread, i.e. to improve the homogeneity of the bookshelf alignment. As mentioned above, the inventors have realized that the intrinsic physical properties of AFLC materials rule out the possibility of a homogeneous bookshelf alignment and therefore the dark state problem cannot be solved in this way. Moreover, in addition to the static transmission leakage (at E=0), we have the dynamic leakage when the display is driven by electric signals in order to show information. This leakage is a function $T_\perp(E)$ of the applied field, where the relevant value of E corresponds to the so-called holding voltage. $T_\perp(E)$ is generally of the same order of magnitude as $T_\perp(0)$, with the result that the best AFLC display prototypes have never even reached a contrast value of 50:1, whereas values in excess of 200:1 are definitely required for color displays and values in excess of 500:1 is required for TV. This has been the single most important factor preventing manufacturing of AFLC displays, in spite of a decade of industrial development of this promising technology.

The inventors realized that by using significantly higher tilt angles than the ones for conventional AFLC materials, we can solve the dark state problem without having to solve the alignment problem by introducing the class of orthoconic AFLC materials which, in the surface-stabilized state, have new and qualitatively different optical properties than AFLC materials synthesized and investigated so far. The qualitatively different optical properties appear as θ approaches the value of 45°. In fact, and quite unexpectedly, for θ=45° the AFLC is uniaxial with the optic axis perpendicular to the molecular tilt plane and, hence, perpendicular to the plane of the cell. Therefore, at E=0 normal incident light always travels along the optic axis and the device is totally dark between crossed polarizers, independently of any misalignment of the smectic layers. Thus, the static part of the dark state problem is solved. In addition it turns out that the pretransitional optical effect is absent. Thus, also the dynamic problem is removed. Together these two effects change the condition for AFLC devices and displays from having a non-acceptable contrast to having better contrast and a better viewing angle than in any other kind of liquid crystal technology.

Figure 7:
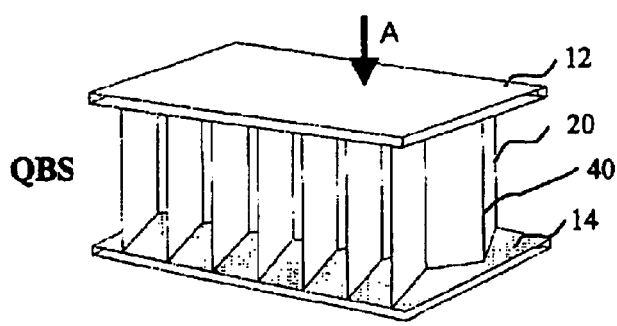
Figure 8:
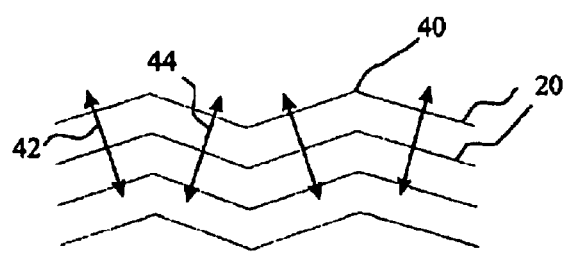

The pretransitional effect can in prior art AFLC displays be modeled as an field induced tilt of the effective optic axis combined with an increase of the effective birefringence Δn in the plane of the cell. The present inventors have found that not only the static but also the dynamic light leakage is minimized if using a surface-stabilized orthoconic AFLC material. As schematically illustrated in FIGS. 7 and 12a, there are domains with different orientations of the smectic layer normal in the cell. Each of these domains gives a transmission $T_\perp$ dependent on 1) the deviation of the effective optic axis φ from the transmission axis of the polarizer, and 2) the effective birefringence Δn according to equation (9) above. Thus, the dynamic light leakage in prior-art AFLCDs is due to field induced changes in both φ (φ(E)) and Δn (Δn(E)) below the threshold for AFF transition. As can be seen from eq. (9) the dynamic leakage due to Δn(E) increases with increasing φ(E) and vice versa. Moreover, the dynamic leakage increases the larger the spatial variations in the smectic layer normal orientation. The present inventors have realized that by using an orthoconic AFLC both Δn(E) and φ(E) are minimized, as the indicatrix has to undergo a much more drastic change (from oblate to prolate) in order to give a visible shift in the optic axis compared to prior-art displays where the effective optic axis is already in the plane of the cell. In the orthoconic case we have Δn=0 at zero field, and in fact, even if the applied electric field makes the tilt-plane slightly bend out (Fredriks transition) from the horizontal condition, there will only be a slight reorientation of the oblate indicatrix, and Δn will be kept very close to zero. In conclusion, the surface-stabilized orthoconic AFLC with horizontal tilt-plane condition minimizes both the static and the dynamic light leakage in AFLCDs.

The class of orthoconic AFLC materials does not only include materials of θ exactly being 45° this value represents the ideal case. As the tilt angle has to be permitted to vary slightly over a broad temperature range, we have confirmed by calculation that the excellent dark state is preserved for reasonable variations around 45°. The calculations show that there is a preferred region for θ between 42° and 48°.

The motivation for this can be extracted from the table below where we have calculated the light leakage of SSAFLC for tilt angles in the vicinity of 45°. Moreover, the tilt angle θ in all tilted smectic liquid crystals generally depends on the wavelength of light with an increase in the measured θ for decreasing wavelength. This means that a material that has a tilt of 45° for green light very well might have a tilt angle of about 46 to 48° for blue light and about 42 to 44° for red light. But, as seen from the table below, the significant increase in tilt when we go from conventional to orthoconic materials, where the effective orthoconic region may be defined as 40°<θ<50°, leads to a completely new range of achievable contrast ratios for AFLC displays. Among the orthoconic AFLCs θ=45°(λ̄) materials, where λ̄ (in the green) corresponds to the peak sensitivity of the human eye, constitutes the ideal case the prime example of such materials. For θ=45° the theoretical contrast is "infinite" and only limited by the quality of the polarizers.

TABLE 3

Calculated light leakage for surface-stabilized orthoconic AFLC devices. The contrast values for orthoconic AFLC devices are orders of magnitude higher for the same degree of layer misalignment than for conventional AFLC devices, cf. Table 2.

| Tilt angle θ | Misalignment | $T_\perp(0)$ | Contrast |
|---|---|---|---|
| 40° (50°) | 15° | 1.7% | ≈58:1 |
| 41° (49°) | 15° | 1.1% | ≈91:1 |
| 42° (48°) | 15° | 0.7% | ≈142:1 |
| 43° (47°) | 15° | 0.3% | ≈333:1 |
| 44° (46°) | 15° | 0.06% | ≈1667:1 |
| 45° | 15° | 0.00% | ∞ |
| 40° (50°) | 10° | 0.80% | ≈125:1 |
| 41° (49°) | 10° | 0.55% | ≈181:1 |
| 42° (48°) | 10° | 0.29% | ≈345:1 |
| 43° (47°) | 10° | 0.14% | ≈715:1 |
| 44° (46°) | 10° | 0.04% | ≈2500:1 |
| 45° | 10° | 0.00% | ∞ |
| 40° (50°) | 5° | 0.21% | ≈476:1 |

TABLE 3-continued

Calculated light leakage for surface-stabilized orthoconic
AFLC devices. The contrast values for orthoconic AFLC
devices are orders of magnitude higher for the same degree of layer
misalignment than for conventional AFLC devices, cf. Table 2.

| Tilt angle θ | Misalignment | $T_1(0)$ | Contrast |
|---|---|---|---|
| 41° (49°) | 5° | 0.14% | ≈715:1 |
| 42° (48°) | 5° | 0.08% | ≈1250:1 |
| 43° (47°) | 5° | 0.04% | ≈2500:1 |
| 44° (46°) | 5° | 0.01% | ≈10000:1 |
| 45° | 5° | 0.00% | ∞ |

As can be seen from these data and has been verified experimentally, a contrast >1000:1 (note that there is no dynamic leakage) can be achieved for 42°<θ<48°, which is the preferred region for the value of tilt in orthoconic materials. For 44°<θ<46° a contrast of about 10,000:1 can be achieved.

Reflective AFLCD Modes

In the following we describe three reflective AFLC geometries utilizing only one polarizer. The calculated expressions for the reflected intensity $R_n$ are quite general and hold for all values of θ for the AFLC, but as we will see all modes are optimized for θ=45°, and moreover, the optimized version of the third mode is exclusively dedicated to orthoconic AFLCs. In the calculations we have assumed perfect LC alignment, which is never achieved. The consequences of misalignment will be discussed for each mode in turn.

Reflective-type Display Having Normally White Mode

The principle for the normally white mode is schematically shown in FIG. 15. A vertical polarizer 100 is placed in front of an SSAFLC cell 102 with its polarizing direction 104 along (or perpendicular to) the smectic layer normal z. At the rear end of the display there is a metallic mirror 106. The reflected intensity Rn (generally valid for all AFLC materials, not only orthoconic) of this structure is given by $$R_n = 1 - \sin^2 2\theta_e \sin^2\left(2\pi \frac{d\Delta n}{\lambda}\right) \quad (10)$$

where $\theta_e$ is the angle between the effective optic axis and the polarizer axis.

In the zero-field anticlinic state $\theta_o=0$ and $R_n=1$. The light travels through the cell without any change of light polarization. There is no polarization change upon reflection, and the reflected light escapes back through the polarizer 100. Hence, we have a bright state. In the switched synclinic state, $R_n$ is a function of $\theta_c=\theta$, the wavelength λ, and the birefringence $\Delta n=\Delta n_{syn}$. By using an orthoconic AFLC (θ=45°) and tuning the LC slab 102 to be a quarter wave plate in the synclinic state we get $R_n=0$ and thus a black state. The vertically polarized light is changed into circular polarized light of which the handedness depends on the sign of the applied voltage. Because of the change of handedness on reflection, the light is horizontally polarized after passing the LC and is absorbed by the polarizer Normally Black Mode Using a λ/4 Plate Between Liquid Crystal and Mirror FIG. 16 illustrates a reflective-type display utilizing the anticlinic state for the dark state instead. In this case the cell thickness correspond to the quarter-wave condition and a passive quarter-wave retarder 108 is added between the AFLC slab 102 and the metallic mirror 106. The fast axis of the retarder 108 makes an angle of 45° with respect to the polarizer. At E=0, incident vertically polarized light travels through the liquid crystal 102 without any change of polarization as it either travels perpendicular to or along (for orthoconic materials) the optic axis. The linearly polarized light is transformed into circular light by the passive λ/4 plate 108 and is reflected (at 106) with a change of handedness. The retarder 108 then transforms the light in horizontally polarized light, which is transmitted by the liquid crystal 102 without change of polarization and is absorbed by the polarizer.

In the two field-on synclinic states, the orthoconic AFLC slab 102 and the quarter-wave retarder 108 add up to a half-wave plate for one polarity of the applied voltage and they cancel for the opposite polarity. As the light travels through the cell twice in the reflective geometry the total phase-shift between the orthogonally polarized waves in the two cases are 360 and 0 degrees, respectively. This results in vertically polarized light and we have the bright state for both polarities of the field-on states.

Let us now study this geometry in a general case, i.e. without specifying the parameters γ, θ, and d. A calculation for the optical system of FIG. 16 using the Jones calculus gives $$R_n = 1 - \left[\begin{array}{c}\sin 2(\gamma - \theta_e)\cos 2\theta_e + \\ \cos 2(\gamma - \theta_e)\sin 2\theta_e \cos\left(2\pi \frac{d\Delta n_e}{\lambda}\right)\end{array}\right]^2 \quad (11)$$

As expected, in order to obtain a dark state for $\theta_e=0$ we must choose γ=±45°. If we substitute $\theta_e$ with the molecular tilt θ get $$R_n = 1 - \left[\cos^2 2\theta + \sin^2 2\theta \cos\left(2\pi \frac{d\Delta n_{syn}}{\lambda}\right)\right]^2 \quad (12)$$

which is the reflected intensity in the synclinic bright states. It turns out that a maximized bright state ($R_n=1$) can be achieved by tuning d as a function of the apparent tilt angle θ of the material for 22.5°≦θ≦67.5°. FIG. 17 visualizes the dependence of the reflection on tilt angle and thickness for the field-on states. Thus, this mode provides in theory a method of using also conventional AFLCs for high contrast displays, but for materials with a tilt angle lower than substantially 45° the dark state becomes in reality strongly dependent on the quality of alignment and the achievable contrast is severely reduced. Therefore this reflective mode is optimized for orthoconic materials due to their perfect dark state.

Normally Black Mode Using a λ/4 Plate Between Polarizer and Liquid Crystal

Figure 4:
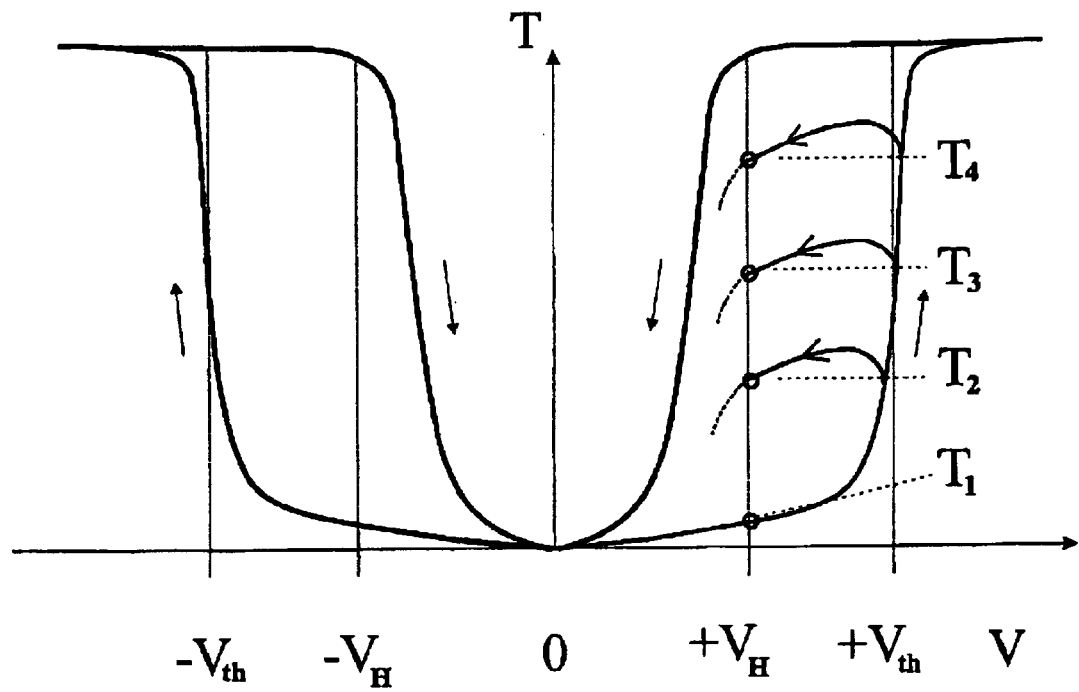
FIG. 4 is a hysterisis curve illustrating the transmission as a function of applied voltage for a prior-art AFLCD.
Figure 5:
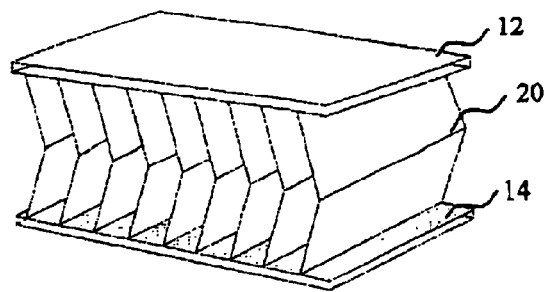
FIGS. 5 to 8 illustrate different structures of smectic layers in a AFLC device and the filed-induced transformation from vertical to horizontal chevron structure.
Figure 6:
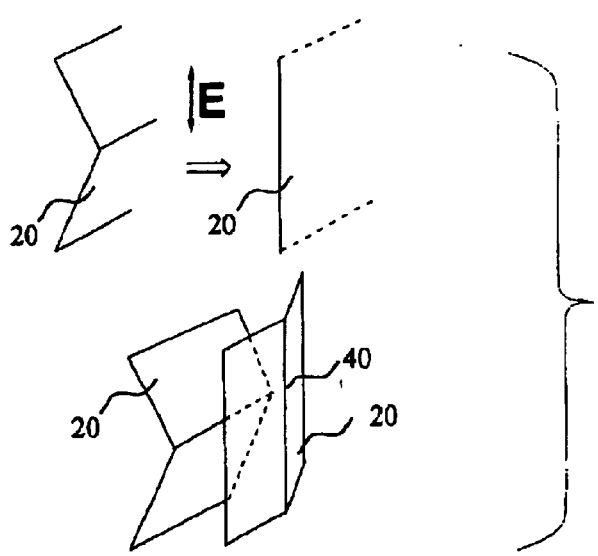

Let us now switch the positions of the liquid crystal slab 102 and the passive quarter-wave plate 108, as shown in FIG. 18. For the two synclinic states we have the same optical geometry as described before, i.e., two quarter wave plates in series giving a total phase shift of either 0° or 360°, yielding maximum reflected intensity. To achieve the zero-field dark state, however, we cannot in this case permit any effective birefringence of the LC. Therefore only orthoconic ALFCs can be used, for which $\Delta n_{anti}=0$, cf. equation (4). A rigorous Jones calculus for the geometry depicted in FIG. 4 gives $$R_n = \cos^2 2\gamma \cos^2\left(2\pi \frac{d\Delta n}{\lambda}\right) + \qquad (13)$$

$$\cos^2 2(\gamma - \theta_e)\sin^2\left(2\pi \frac{d\Delta n}{\lambda}\right) +$$

$$\sin^2 2\gamma \sin^2 2(\gamma - \theta_e)\sin^2\left(2\pi \frac{d\Delta n}{\lambda}\right) +$$

$$\sin 2\gamma \cos 2\gamma \sin 2(\gamma - \theta_e)\sin\left(4\pi \frac{d\Delta n}{\lambda}\right)$$

By inserting $\gamma=45°$ and $\theta=45°$ we get the optimized case for this mode described by the simple relation $$R_n = \sin^2\left(2\pi \frac{d\Delta n}{\lambda}\right) \qquad (14)$$

In conclusion, this normally dark mode can only be achieved with good quality when using orthoconic antiferroelectric and it shows no parallax problem. A very interesting property of this mode is the fact that it does not matter how the circular polarizer (the linear polarizer together with the quarter wave retarder separated by $\gamma=45°$) is oriented on top of the liquid crystal cell. The simplicity of this construction is comparable with the normally white mode construction but, in addition, it uses the perfect dark state of the surface-stabilized orthoconic AFLC materials. It might be argued that the two bright states are not quite symmetric as one corresponds to 0° and the other to 360° degrees phase shift between the orthogonal components of the light, which could lead to coloration. However, by using achromatic retarders this effect could be reduced. Moreover, for most projection displays monochromatic light is used which rules out this problem. An elegant solution of the problem of the use of white light is to replace the quarter wave retarder with a surface-stabilized ferroelectric liquid crystal (SSFLC) cell tuned to be a quarter wave plate. Since we need to switch the retarder between two positions separated by 90° this component should be based on an FLC (SmC*) material with $\theta=45°$.

Scattering-type Devices

In most LC display applications polarizers are used and the intensity modulation is achieved by the field-controlled change of the state of light polarization between the polarizers. However, this inevitable limits the maximum transmitted intensity (output) to 50% assuming that the incident light (e.g. backlight) is unpolarized as is usually the case. Moreover, in high intensity light applications there is a substantial heating of the polarizer and analyzer in the dark state when the light is absorbed. This, for instance, excludes the use of ordinary polymer dichroic polarizers since they might be destroyed or even melted due to the strong heating. Therefore there is often a need for polarizer-free intensity modulators. The simplest polarizer free LC device imaginable is a field-controlled scattering device where the device may be switched between a non-scattering and a scattering state. Polymer dispersed liquid crystals (PDLCs) and dynamic scattering mode (DSM) devices are well-known examples of this.

According to the invention, there is also provided a new type of polarizer-free display/device utilizing orthoconic AFLC materials. The principles for the new device is as follows:

Random Bookshelf Structure

Referring to FIG. 19, a substantially 45°-tilt AFLC material is confined between two electroded supports, e.g. glass plates with sputtered ITO layers as electrodes. The AFLC material is arranged in a "random bookshelf structure" with the liquid crystal texture being divided into small domains 120 where the smectic layers 122 are perpendicular to the confining substrate surfaces. There is no in-plane correlation between the smectic layer normal directions z of different domains. We may call each domain a bookshelf microdomain and due to the uncorrelated arrangement of the different microdomains we call this texture a random bookshelf structure (RBS). Such a texture may be achieved by imposing degenerate planar boundary conditions in combination with the application of electric fields. The latter then irreversibly orients the smectic layers perpendicular to the support surfaces, and hence confines the smectic layer normal z everywhere in the plane of the cell.

At E=0, the light will experience a negatively uniaxial LC material with the optic axis perpendicular to the cell walls, as described earlier. Hence, the light "will not see" the microdomain structure 120 (optically all microdomains 120 look the same) and will pass through the AFLC layer without being scattered.

At $E>E_{th}$ and $E<-E_{th}$, however, the AFLC is switched into the synclinic ferroelectric states and the optical properties of the AFLC layer is drastically changed. Now, each microdomain 120 is essentially uniaxial with its optic axis in the plane of the cell. Since the smectic layer normal directions z are uncorrelated between different microdomains 102, also the optic axis directions between different microdomains 102 are uncorrelated. (The optic axis is tilted a constant angle of 45° with respect to the smectic layer normal z in the synclinic ferroelectric states). Due to the inhomogeneous alignment of adjacent domains 102 with different positions of the optic axis in the plane of the cell, the incident light will be scattered due to the domain structure.

Polymer Dispersed Orthoconic AFLCs—Example No. 1.

FIG. 20 schematically shows a field-controlled scattering device including a polymer dispersed orthoconic AFLC. Small (micronsized) flat droplets 130 of an orthoconic AFLC material 132 are embedded in an isotropic polymer matrix 134, together forming an polymer dispersed liquid crystal (PDLC) film 140 between two electroded supports 136. The AFLC helix is suppressed due to the small size of the droplets and inside each droplet 130 the AFLC is in the horizontal tilt plane structure. This structure, with the smectic layers being vertical inside the droplets in FIG. 20 (and essentially perpendicular to the PDLC film 140), is a irreversibly achieved by means of the application of electric fields across the PDLC film 140 as the smectic layers reorients to be along the applied field. The droplets 130 are so oriented that, in the absence of electric fields, the effective optic axis 131 of the droplets 130 are perpendicular to the cell plane. The refractive index of the polymer $n_p$ is matched to the effective refractive index $n_{eff}=n_o$ of the AFLC, i.e. $n_p=n_{eff}$, and light at normal incidence will be transmitted without scattering. On the other hand, on applying a sufficiently high electric field between across the PDLC film, the AFLC droplets 130 switch into the synclinic ferroelectric states with the effective optic axis in the plane of the film 140. Now the index matching is lost and light will experience different refractive indices in the matrix and the AFLC droplets which results in scattering of the light.

Polymer Dispersed Orthoconic AFLCs—Example No. 2

FIG. 21 schematically illustrates a polymer dispersed orthoconic AFLC in which the polymer matrix is instead made optically anisotropic. With the principal refractive indices of the polymer matched to the ones of the orthoconic APLC, i.e. both the polymer and the AFLC presents the same oblate optical indicatrix, we get perfect index matching for all angles of incidence at zero field and the transmission will be essentially independent of the viewing angle. Such an anisotropic polymer matrix could be made of a polymer discotic liquid crystal, for example. In the field induced ferroelectric states of the AFLC the index matching is lost and the PDLC film scatters light.

In conclusion the scattering type devices based on orthoconic AFLCs can be described as follows:

1. They are field-controlled scattering type liquid crystal devices
2. The devices are non-scattering in the off-field state and scattering in the on-field state
3. We actively drive the device from the non-scattering state to the scattering state by application of the driving voltage. This is very attractive for shutter purposes.
4. The working speed is the same as for common AFLCDs which makes possible video speed reproduction.
5. High intensity light might be used since there are no absorbing polarizers involved.
6. The drive electronics and waveforms are similar to the ones for common AFLCDs.
7. Passive or active matrix addressing might be used for such devices.
8. The devices can be used in transmissive mode or reflective mode according to paragraphs (a) to (c) below:
    (a) In transmissive mode
    (b) In reflective mode with an absorbing (colored or black) background. Then the scattering state appears opaque (or milky) and the non-scattering state makes the background color visible.
    (c) In reflective mode with a mirror background. Then the scattering state appears opaque and the non-scattering state specularly reflects any light hitting the device
9. Neither rubbing nor photo-alignment of aligning layers are used in the production.
10. The sensitivity to the cell layer thickness is less than for common AFLC devices since the electrooptic effect is not based on interference effects in half-wave-, quarter-wave plates, or similar structures, but on scattering.

Phase-only Modulation by Means of LCs.
Three-level Phase-only Modulation Device Based on Orthoconic AFLCs Referring to FIG. 22, now consider a surface-stabilized orthoconic material with 45° molecular tilt in the horizontal condition. Such arrangement gives a uniaxial optical medium with the optic axis 140 perpendicular to the glass plates. Incoming light at normal incidence will therefore keep its state of polarization 141 when transmitted through the LC slab, experiencing the effective refractive index $n_{\it eff}(E=0) \approx (n_\beta=n_\gamma=n_o)$ of the oblate optical indicatrix of the anticlinic state of the AFLC material. Now place the cell with the smectic layer normal z at 45° with respect to the plane of polarization 141 of incoming light, as shown in FIG. 22. If we apply an electric field $E>E_{th}$ we may switch the AFLC into one of its ferroelectric states (to the right in FIG. 22). This corresponds to a effectively uniaxial plate with its optic axis 142 along the glass plates. Hence, the state of polarization of the transmitted light 144 will be unaffected but the experienced refractive index will now be $n_{\it eff}(E>E_{th})=n_3$ of the prolate optical indicatrix of the field induce synclinic state. If we reverse the polarity of the electric field, i.e. we apply a field $E<-E_{th}$ we will switch the AFLC into the opposite ferroelectric state (to the left in FIG. 22). Now the optic axis 146 is oriented perpendicular to the incoming polarization 141. Again the state of polarization of the incoming plane-polarized light will not be changed (143) but now the light experiences an effective refractive index $n_{\it eff}(E<-E_{th})=n_1$ of the prolate indicatrix of the opposite synclinic state. Hence, for $E<-E_{th}$, E=0, and $E>E_{th}$, the light will experience three different refractive indices without changing its state of polarization 141 and we have a tree-level phase-only modulating device. An optimized device would have a thickness corresponding to $d\Delta n=2\lambda/3$ providing effectively 0°, 120°, and 240° phase-shift for $E<-E_{th}$, E=0, and $E>E_{th}$, respectively, where $\Delta n=n_3-n_1$ in the synclinic states.

Orthoconic AFLC Polarization Switch

In FIG. 23 is illustrated a surface-stabilized orthoconic AFLC tuned to give a quarter wave plate in the synclinic state. This makes a polarization switch, which transforms linearly polarized light 150 into left-handed circular polarized light 152 or right-handed circular polarized light 154 by means of applied electric fields of opposite polarity (±Eth). At E=0 the polarization state of the incident light 150 is not affected. Moreover, incoming circular light can be switched to horizontal or vertical linearly polarized states.

The device also works in the opposite way, and can therefore be used as a detector for circularly polarized light.

The same structure, but with the cell thickness tuned to give a half-wave plate in the synclinic states makes a polarization switch which transforms left-handed circular into right-handed circular light, or vice versa. Moreover, it transforms vertically/horizontally linearly polarized light in to horizontally/vertically linearly polarized light. In the latter cases positive and negative fields gives linearly polarized waves with a relative phase shift of 180°. In the zero-field anticlinic state, light is transmitted without change of its state of polarization.

Additional advantages and modifications will readily occur to those skilled in the art. Therefore, the invention in its broader aspects is not limited to the specific details and representative embodiments shown and described herein. Accordingly, various modifications may be without departing from the spirit of scope of the general inventive concept as defined by the appended claims and their equivalent.

What is claimed is:

1. A liquid crystal device, comprising an antiferroelectric liquid crystal material (AFLC material) having smectic layers, and two substrates confining said AFLC material therebetween, wherein said AFLC material is uniaxial negative, the AFLC material being uniaxial as a consequence of a surface stabilization of said AFLC material and of a selected smectic tilt angle θ of said AFLC material.

2. A liquid crystal device as claimed in claim 1, wherein the substrates are located at a mutual distance that is sufficiently small to accomplish said surface stabilization.

3. A liquid crystal device as claimed in claim 1, wherein said AFLC material comprises a pitch compensated AFLC material in order to accomplish said surface stabilization.

4. A liquid crystal device as claimed in claim 1, wherein said smectic tilt angle θ is selected such that $40° \leq \theta \leq 50°$.

5. A liquid crystal device as claimed in claim 1, wherein said smectic tilt angle θ is selected such that $42° \leq \theta \leq 48°$.

6. A liquid crystal device as claimed in claim 1, wherein said smectic tilt angle θ is selected such that $43° \leq \theta \leq 47°$.

7. A liquid crystal device as claimed in claim 1, wherein said smectic tilt angle θ is selected such that $44° \leq \theta \leq 46°$.

8. A liquid crystal device as claimed in claim 1, wherein said smectic tilt angle θ is selected such that $\theta=45°$.

9. A liquid crystal device as claimed in claim 1, wherein said AFLC material is such that said smectic tilt angle θ reaches 45° and deviates from this value by less than 3° within a temperature range being at least 50° C. wide.

10. A liquid crystal device as claimed in claim 1, wherein said negative uniaxial AFLC material presents a smallest refractive index ($n_\alpha$) in a direction perpendicular to said substrates.

11. A liquid crystal device as claimed in claim 1, wherein said AFLC material presents a molecule tilt plane parallel to said substrates.

12. A liquid crystal device as claimed in claim 11, wherein the substrates are located at a mutual distance which is sufficiently small to provide not only a surface stabilization of said AFLC material but also to make said molecular tilt plane parallel to said substrates.

13. A liquid crystal device as claimed in claim 1, wherein said smectic layers are oriented perpendicular to said substrates.

14. A liquid crystal device as claimed in claim 1, wherein said smectic layers are oriented perpendicular to said substrates and presents a chevron structure.

15. A liquid crystal device as claimed in claim 1, wherein said uniaxial negative AFLC material presents a cone axis and an optic axis, which is perpendicular to said cone axis.

16. A liquid crystal device as claimed in claim 1, wherein said AFLC material presents a sharp threshold for an AFF transition.

17. A liquid crystal device as claimed in claim 1, further comprising means for applying an electric field over said AFLC material, the liquid crystal device thereby being an electrooptic liquid crystal device, wherein said AFLC material being uniaxial negative in a zero-field state (E=0).

18. An electrooptic liquid crystal device as claimed in claim 17, wherein said AFLC material being switchable by the application of an electric field to a positive biaxial, ferroelectric state.

19. An electrooptic liquid crystal device as claimed in claim 17, wherein said AFLC material, by the application of an electric field E, is switchable from a uniaxial negative, antiferroelectric state to a biaxial positive, ferroelectric state presenting an effective optic axis directed perpendicular to the applied field E.

20. An electrooptic liquid crystal device as claimed in claim 17, wherein the AFLC material, when being in a zero-field condition (E=0), presents an optic axis that is parallel to a direction in which said electrical field is applied in a field-on condition.

21. An electrooptic liquid crystal device as claimed in claim 17, wherein said AFLC material presents an effective optic axis being switchable between two directions lying in a plane containing said electric field E.

22. An electrooptic liquid crystal device as claimed in claim 17, wherein said AFLC material presents an effective optic axis being switchable between a zero-field direction and a field-on direction, said zero-field direction and said field-on direction lying in a plane containing said electric field E.

23. An electrooptic liquid crystal device as claimed in claim 17, wherein said AFLC material presents an effective optic axis being switchable between three orthogonal directions.

24. An electrooptic liquid crystal device as claimed in claim 23, wherein two of said three orthogonal directions are parallel to the substrates.

25. An electrooptic liquid crystal device as claimed in claim 17, wherein said AFLC material presents an effective optic axis being switchable between three orthogonal directions:

a first direction in a zero-field condition in which the AFLC material is uniaxial negative with the effective optic axis directed perpendicular to said substrates, a second direction in a positive field-on condition in which the AFLC material is biaxial positive with the effective optic axis directed parallel to said substrates, and a third direction in a negative field-on condition in which the AFLC material is biaxial positive with the effective optic axis directed parallel to said substrates and perpendicular to said second direction.

26. An electrooptic liquid crystal device as claimed in claim 17, wherein said device being structured as a transmissive electrooptic liquid crystal device.

27. A transmissive electrooptic liquid crystal device as claimed in claim 26, further comprising additional passive optical components.

28. A transmissive electrooptic liquid crystal device as claimed in claim 27, further comprising additional active optical components.

29. An electrooptic liquid crystal device as claimed in claim 17, wherein said device being structured as a transmissive electrooptic liquid crystal device, wherein said means for applying an electric field comprises electrodes arranged on inner surfaces of said substrates.

30. A transmissive electrooptic liquid crystal device as claimed in claim 29, wherein said electrodes define a plurality of addressable pixels.

31. A transmissive electrooptic liquid crystal device as claimed in claim 30, wherein said addressable pixels are arranged in orthogonal rows and columns.

32. A transmissive electrooptic liquid crystal device as claimed in claim 30, comprising a thin film transistor circuit for each addressable pixel.

33. A transmissive electrooptic liquid crystal device as claimed in claim 30, wherein said means for applying an electrical field is arranged to apply electric fields of alternate (±E) sign to alternate columns.

34. An electrooptic liquid crystal device as claimed in claim 17, wherein said device being structured as a transmissive electrooptic liquid crystal device, further comprising two polarizers arranged on opposite sides of the AFLC material.

35. A transmissive electrooptic liquid crystal device as claimed in claim 34, wherein said two polarizers are linear polarizers.

36. A transmissive electrooptic liquid crystal device as claimed in claim 35, wherein said linear polarizers are oriented parallel and perpendicular, respectively, to an average smectic layer normal z.

37. A transmissive electrooptic liquid crystal device as claimed in claim 34, wherein said polarizers are circular polarizers.

38. An electrooptic liquid crystal device as claimed in claim 17, wherein said device being structured as a reflective electrooptic liquid crystal device.

39. A reflective electrooptic liquid crystal device as claimed in claim 38, further comprising additional passive optical components.

40. A reflective electrooptic liquid crystal device as claimed in claim 38, further comprising additional active optical components.

41. A reflective electrooptic liquid crystal device as claimed in claim 38, wherein one of said two substrates is in the form of a rear reflective substrate.

42. An electrooptic liquid crystal device as claimed in claim 17, wherein said device being structured as a reflective electrooptic liquid crystal device and wherein said means for applying an electric field comprises electrodes arranged on inner surfaces of said substrates.

43. A reflective electrooptic liquid crystal device as claimed in claim 42, wherein said electrodes define a plurality of addressable pixels.

44. A reflective electrooptic liquid crystal device as claimed in claim 43, wherein said addressable pixels are arranged in orthogonal rows and columns.

45. A reflective electrooptic liquid crystal device as claimed in claim 43, comprising a thin film transistor for each addressable pixel.

46. A reflective electrooptic liquid crystal device as claimed in claim 38, wherein said means for applying an electrical field is arranged to apply electric fields of alternate (±E) sign to alternate columns.

47. An electrooptic liquid crystal device as claimed in claim 17, wherein said device being structured as a reflective electrooptic liquid crystal device, further comprising a linear polarizer arranged at a front substrate of said two substrates.

48. An electrooptic liquid crystal device as claimed in claim 17, wherein said device being structured as a reflective electrooptic liquid crystal device, further comprising a circular polarizer arranged at a front substrate of said two substrates.

49. An electrooptic liquid crystal device as claimed in claim 17, wherein said device being structured as a reflective electrooptic liquid crystal device, a rear one of said two substrates being a CMOS silicon backplane for active addressing of the liquid crystal in individual pixels.

50. An electrooptic liquid crystal device as claimed in claim 17, wherein said device being structured as a phase modulation device.

51. An electrooptic phase modulation liquid crystal device as claimed in claim 50,
    wherein said AFLC material presents a smectic layer normal direction z and an effective optic axis being switchable between three orthogonal directions:
        a first direction in a zero-field condition in which the AFLC material is uniaxial negative with the effective optic axis directed perpendicular to said substrates,
        a second direction in a positive field-on condition in which the AFLC material is biaxial positive with the effective optic axis directed parallel to said substrates, and
        a third direction in a negative field-on condition in which the AFLC material is biaxial positive with the effective optic axis directed parallel to said substrates and perpendicular to said second direction; and
    wherein the device being arranged to receive linear polarized light with the direction of polarization being at 45 degrees in relation to said normal direction (z) of the smectic layers.

52. An electrooptic phase modulation liquid crystal device as claimed in claim 51, wherein said device further comprises polarization means arranged to accomplish a linear polarization of incident light in a direction at 45 degrees in a relation to said normal direction (z) of the smectic layers.

53. An electrooptic phase modulation liquid crystal device as claimed in claim 51, further comprising electrode means defining a plurality of pixels, each of which allows an individual phase-modulation of incident light.

54. An electrooptic phase modulation liquid crystal device as claimed in claim 50, said device comprising means arranged to accomplish polarization of incident light parallel to an effective optic axis in a first synclinic state of said AFLC material and perpendicular to an effective optic axis in a second synclinic state of said AFLC material.

55. An electrooptic phase modulation liquid crystal device as claimed in claim 54, further comprising electrode means defining a plurality of pixels, each of which allows an individual phase-modulation of incident light.

56. An electrooptic liquid crystal device as claimed in claim 17, wherein said device being structured as a polarization switching device.

57. An electrooptic polarization switching liquid crystal device as claimed in claim 56, wherein the device is arranged to switch the polarization of light between different linear and circular polarization states.

58. An electrooptic liquid crystal device as claimed in claim 17, wherein said AFLC material being in the form of a dispersed AFLC material.

59. A electrooptic liquid crystal device as claimed in claim 58, wherein said device being switchable between non-scattering and scattering states.

60. A electrooptic liquid crystal device as claimed in claim 58, wherein said AFLC material being dispersed in a polymer part.

61. A electrooptic liquid crystal device as claimed in claim 58, wherein said polymer part is a polymer discotic liquid crystal.

62. An electrooptic liquid crystal device as claimed in claim 17, wherein said AFLC material being arranged in domains presenting mutually different orientation of smectic layers of said AFLC materials, in order for said device to operate as a field-controlled scattering device.

63. A liquid crystal device as claimed in claim 1, wherein the AFLC material is polymer-stabilized.

64. An antiferroelectric liquid crystal device switchable between bright and dark states, said device comprising an AFLC material having a molecular tilt angle in an anticlinic state that is selected such that the extinction in said dark state is substantially insensitive to a smectic layer orientation in different liquid crystal domains in the device.

65. An antiferroelectric liquid crystal device (AFLCD), comprising a surface stabilized AFLC material which is confined between two substrates and which is switchable between, on the one hand, a biaxial negative state having the axis corresponding to the smallest principal value of refractive index directed perpendicular to said substrates and, on the other hand, two biaxial positive states having the axis of the largest principal value of refractive index oriented parallel to the substrates.

\* \* \* \* \*